(12) United States Patent
Shimofure et al.

(10) Patent No.: US 10,631,037 B2
(45) Date of Patent: Apr. 21, 2020

(54) DECODING DEVICE, RECEPTION DEVICE, TRANSMISSION DEVICE, TRANSMISSION/RECEPTION SYSTEM, DECODING METHOD, AND STORAGE MEDIUM HAVING DECODING PROGRAM STORED THEREIN

(71) Applicant: NEC Corporation, Tokyo (JP)

(72) Inventors: Kensuke Shimofure, Tokyo (JP); Yasuhisa Nakata, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/550,054

(22) PCT Filed: Feb. 18, 2016

(86) PCT No.: PCT/JP2016/000875
§ 371 (c)(1),
(2) Date: Aug. 10, 2017

(87) PCT Pub. No.: WO2016/139909
PCT Pub. Date: Sep. 9, 2016

(65) Prior Publication Data
US 2018/0014060 A1 Jan. 11, 2018

(30) Foreign Application Priority Data
Mar. 2, 2015 (JP) .................. 2015-040480

(51) Int. Cl.
*H04N 7/16* (2011.01)
*H04N 21/434* (2011.01)
(Continued)

(52) U.S. Cl.
CPC ........... *H04N 21/434* (2013.01); *H04N 21/43* (2013.01); *H04N 21/4302* (2013.01);
(Continued)

(58) Field of Classification Search
CPC .. H04N 21/435; H04N 21/84; H04N 21/4622; H04N 21/8166; H04N 21/6567; H04N 21/235; H04N 21/4348
(Continued)

(56) References Cited

U.S. PATENT DOCUMENTS

| 6,393,055 B1 * | 5/2002 | Martin ............. H04N 21/44016 370/487 |
| 6,438,573 B1 * | 8/2002 | Nilsen ....................... G06F 8/10 718/100 |

(Continued)

FOREIGN PATENT DOCUMENTS

| JP | 2001-359072 A | 12/2001 |
| JP | 2010-517190 A | 5/2010 |

(Continued)

OTHER PUBLICATIONS

"MMT-Based Media Transport Scheme in Digital Broadcasting Systems," ARIB STD-B60, Association of Radio Industries and Businesses, Dec. 2014, Version 1.1, 299 pages.

(Continued)

*Primary Examiner* — Annan Q Shang
(74) *Attorney, Agent, or Firm* — Sughrue Mion, PLLC

(57) ABSTRACT

[Problem] To provide: a decoding device that decodes and replays, in a suitable order, sequentially transmitted information; a reception device; a transmission/reception system; a decoding method; and a storage medium having the decoding program stored therein. [Solution] A decoding unit 21 that decodes packets sent from a transmission device 10. A decoding order determination unit 22 determines the order of packets to be decoded by the decoding unit 21, on the basis of adjustment information that is included in the packet and corresponds to a time adjustment for making Coordinated Universal Time approach Universal Time. The packets include order information indicating the order in the same IP (Continued)

data flow. The decoding order determination unit 22 determines, on the basis of the order information, the order of packets to be decoded by the decoding unit 21, if the adjustment information indicates that a time adjustment will occur.

6 Claims, 15 Drawing Sheets

(51) Int. Cl.
*H04N 21/43* (2011.01)
*H04N 21/61* (2011.01)
*H04N 21/643* (2011.01)
*H04N 21/845* (2011.01)

(52) U.S. Cl.
CPC ..... *H04N 21/4341* (2013.01); *H04N 21/6112* (2013.01); *H04N 21/64322* (2013.01); *H04N 21/8456* (2013.01)

(58) Field of Classification Search
USPC ........................... 725/68, 131, 132, 139, 140
See application file for complete search history.

(56) References Cited

U.S. PATENT DOCUMENTS

| | | | |
|---|---|---|---|
| 2002/0016970 A1 | 2/2002 | Negishi et al. | |
| 2005/0237430 A1* | 10/2005 | Knox | H04N 5/14 348/554 |
| 2006/0093045 A1* | 5/2006 | Anderson | H04N 21/23424 375/240.28 |
| 2007/0070973 A1* | 3/2007 | Kazmi | H04B 7/2693 370/350 |
| 2007/0239894 A1* | 10/2007 | Thind | G04G 9/0076 709/246 |
| 2008/0066142 A1* | 3/2008 | Kim | H04N 5/44513 725/141 |
| 2008/0266453 A1* | 10/2008 | Fisher | G04G 9/0076 348/516 |
| 2009/0103570 A1* | 4/2009 | Bjorkman | H04J 3/0697 370/503 |
| 2009/0217074 A1* | 8/2009 | Nichols | G01V 1/40 713/401 |
| 2012/0140869 A1* | 6/2012 | Choi | H03K 5/131 377/2 |
| 2012/0201101 A1* | 8/2012 | Akiyama | G04R 20/06 368/47 |
| 2013/0003506 A1* | 1/2013 | Kato | G05G 5/005 368/47 |
| 2013/0173742 A1* | 7/2013 | Thomas | H04L 65/4076 709/217 |
| 2014/0195651 A1* | 7/2014 | Stockhammer | H04N 21/23439 709/219 |
| 2014/0282791 A1* | 9/2014 | Schmidt | H04N 21/8547 725/116 |
| 2015/0106645 A1* | 4/2015 | Breuer | G06F 1/12 713/400 |
| 2015/0181003 A1* | 6/2015 | Kim | H04L 69/22 370/474 |
| 2015/0269629 A1* | 9/2015 | Lo | H04L 65/4084 705/14.66 |
| 2016/0050624 A1* | 2/2016 | Tirronen | H04W 52/0216 370/311 |
| 2016/0078901 A1* | 3/2016 | Toma | H04N 21/8456 386/355 |
| 2016/0080755 A1 | 3/2016 | Toma et al. | |
| 2016/0269786 A1* | 9/2016 | Lee | H04N 21/435 |
| 2016/0315991 A1* | 10/2016 | Oh | H04N 21/236 |
| 2017/0257647 A1* | 9/2017 | Iguchi | H04N 21/231 |
| 2018/0227626 A1* | 8/2018 | Nakazawa | H04H 20/30 |
| 2019/0359611 A1* | 11/2019 | Savory | A61K 31/437 |

FOREIGN PATENT DOCUMENTS

| | | |
|---|---|---|
| JP | 2010-272071 A | 12/2010 |
| JP | 2016-152620 A | 8/2016 |
| JP | 6489203 B2 | 3/2019 |
| KR | 10-2008-0022757 A | 3/2008 |
| WO | 2014/196189 A1 | 12/2014 |
| WO | 2016/129413 A1 | 8/2016 |

OTHER PUBLICATIONS

Yuki Kawamura et al., "Prototyping and Verification of an MMT Transport System for 8K SHV Broadcasting," The Institute of Image Information and Television Engineers, Aug. 10, 2014, 2 pages.
Written Opinion of the International Searching Authority of PCT/JP2016/000875 dated May 24, 2016.
International Preliminary Report on Patentability of PCT/JP2016/000875.
International Search Report of PCT/JP2016/000875 dated May 24, 2016.
International Preliminary Report on Patentability dated Apr. 4, 2017 in counterpart International Application No. PCT/JP2016/000874 [PCT/IPEA/409].
Written Opinion dated May 24, 2016 in counterpart International Application No. PCT/JP2016/000874 [PCT/ISA/237].
International Search Report dated May 24, 2016 in counterpart International Application No. PCT/JP2016/000874 [PCT/ISA/210].
Communication dated Aug. 21, 2018 in counterpart Korean Application No. 10-2017-7027862.
Communication dated Sep. 25, 2018 in counterpart Japanese Application No. 2017-217394.
Communication dated Aug. 27, 2019 from Japanese Patent Office in counterpart JP Application No. 2017-237042.
Communication dated May 3, 2019 from the Mexican Patent Office in application No. MX/a/2017/011368.

* cited by examiner

U.S. 10,631,037 B2

DECODING DEVICE, RECEPTION DEVICE, TRANSMISSION DEVICE, TRANSMISSION/RECEPTION SYSTEM, DECODING METHOD, AND STORAGE MEDIUM HAVING DECODING PROGRAM STORED THEREIN

CROSS REFERENCE TO RELATED APPLICATIONS

This application is a National Stage of International Application No. PCT/JP2016/000875 filed Feb. 18, 2016, claiming priority based on Japanese Patent Application No. 2015-040480 filed Mar. 2, 2015, the contents of all of which are incorporated herein by reference in their entirety.

TECHNICAL FIELD

The present invention relates to a decoding apparatus, a receiver, a transmitter, a transmission/reception system, a decoding method, and a storage medium storing a decoding program for transmission of encoded packets.

BACKGROUND ART

Digitization that changes signals transmitted/received in television broadcasting from analog signals to digital signals has proceeded around the world. In Japan, terrestrial digital broadcasting based on the ISDB-T (Integrated Services Digital Broadcasting-Terrestrial) scheme is performed.

In the terrestrial digital broadcasting based on the ISDB-T scheme, television program information including video information and audio information and data broadcast information (hereinafter, referred to as television program information and the like) are transmitted by radio waves to a large number of receivers. Further, also in satellite broadcasting and cable television broadcasting, similar information is transmitted. The receivers reproduce video and audio on the basis of the transmitted television program information and the like.

Further, for reasons of enhancing the quality of video and audio to be output to receivers, increasing the number of types, and the like, it has been investigated that a larger number of pieces of information are transmitted to receivers, and standardization of a new media transport scheme referred to as MMT (MPEG (Moving Picture Experts Group) Media Transport) has proceeded, as described in, for example, NPL 1.

In PTL 1, a method for appropriately decoding coded data in MMT is described.

CITATION LIST

Patent Literature

[PTL 1] International Publication WO2014/196189

Non Patent Literature

[NPL 1] "MMT-Based Media Transport Scheme in Digital Broadcasting Systems, Version 1.1", [online], December 2014, Association of Radio Industries and Businesses, [retrieved on Feb. 26, 2015], the Internet <URL:http://arib.or.jp/english/html/overview/doc/2-STD-B60v1_1.pdf>

SUMMARY OF INVENTION

Technical Problem

However, even when television program information and the like are transmitted by radio waves, it is difficult for a receiver to appropriately receive the television program information and the like in some cases due to changes in weather conditions or the like.

Therefore, in MMT, via a plurality of transmission paths referred to as a communication line and radio waves, television program information and the like are transmitted/received, and when it has been difficult to appropriately receive the television program information and the like transmitted by radio waves, video and audio are reproduced on the basis of the television program information and the like transmitted via a communication line. To perform reproduction in such a manner, it is necessary for the receiver to decode and reproduce the television program information and the like transmitted via the communication line and the television program information and the like transmitted by radio waves in an appropriate order.

Here, a broadcaster generates time information so that a receiver can perform reproduction in an appropriate order on the basis of a time stamp of NTP (Network Time Protocol) and transmits the generated time information by being associated with television program information and the like. Now, the time stamp of NTP refers to information indicating a time based on NTP. The receiver reproduces video and audio based on the television program information and the like in an appropriate order on the basis of a separately acquired time stamp of NTP and the time information associated with the television program information and the like.

The time stamp of NTP is based on Coordinated Universal Time. Coordinated Universal Time is adjusted to be made close to Universal Time once in several years. The adjustment is performed by inserting a leap second or eliminating a leap second. Specifically, when a leap second is inserted, a time stamp indicating, for example, eight fifty-nine and fifty nine seconds (hereinafter, referred to as "8:59:59" or the like) is generated twice continuously. Further, when a leap second is eliminated, a time stamp indicating the next second of 8:59:58 is generated so as to indicate 9:00:00.

Then, in the method described in Patent Literature 1, when the adjustment is performed, it is difficult for a receiver to appropriately determine an order of reproducing video and audio based on transmitted television program information and the like. In Non Patent Literature 1, any response to the case in which the adjustment is performed is not disclosed.

Further, even when the adjustment is not performed, it is difficult that a receiver having received television program information and the like transmitted via a communication line and television program information and the like transmitted by radio waves reproduces video and audio by decoding these pieces of information in an appropriate order.

Furthermore, even in the case of not performing the adjustment, when a receiver receives television program information and the like in an order different from a transmission order upon transmitting the television program information and the like via a communication line, it is difficult that the receiver decodes and reproduces these pieces of information at an appropriate order.

Therefore, the present invention is intended to provide a decoding apparatus, a receiver, a transmitter, a transmission/reception system, a decoding method, and a storage medium storing a decoding program for decoding pieces of information sequentially transmitted at appropriate order.

Solution to Problem

A decoding apparatus according to an exemplary aspect of the present invention includes: a decoding unit for decoding packets transmitted from a transmitter; and a decode order determination unit for determining an order of the packets decoded by the decoding unit on the basis of adjustment information in accordance with adjustment of times for causing Coordinated Universal Time to be close to Universal Time, the times being included in the packets, wherein the packets include order information that indicates an order in the same IP data flow, and wherein the decode order determination unit determines the order of the packets decoded by the decoding unit on the basis of the order information when the adjustment information indicates that the times are adjusted.

A receiver according to an exemplary aspect of the present invention includes a decoding apparatus according to any one of aspects and a reception apparatus that receives packets.

A transmitter according to an exemplary aspect of the present invention includes, on a reception side, a transmission unit for transmitting packets including adjustment information in accordance with adjustment of times for causing Coordinated Universal Time to be close to Universal Time and order information that indicates an order in the same IP data flow or an asset configured by collection in order to decode packets in accordance with contents in a predetermined order.

A transmission/reception system according to an exemplary aspect of the present invention includes a receiver and a transmitter according to any one of aspects.

A decoding method according to an exemplary aspect of the present invention includes: a decoding step of decoding packets transmitted from a transmitter; and a decode order determination step of determining an order of the packets decoded in the decoding step on the basis of adjustment information in accordance with adjustment of times for causing Coordinated Universal Time to be close to Universal Time, the times being included in the packets, wherein the packets including order information that indicates an order in the same IP data flow, and wherein the decode order determination step determining the order of the packets decoded in the decoding step on the basis of the order information when the adjustment information indicates that the times are adjusted.

A storage medium according to an exemplary aspect of the present invention stores a decoding program that causes a computer to execute: decoding processing for decoding packets transmitted from a transmitter; and decode order determination processing for determining an order of the packets decoded in the decoding processing on the basis of adjustment information in accordance with adjustment of times for causing Coordinated Universal Time to be close to Universal Time, the times being included in the packets, wherein the packets include order information that indicates an order in the same IP data flow, the decode order determination processing determines the order of the packets decoded in the decoding processing on the basis of the order information when the adjustment information indicates that the times are adjusted.

Advantageous Effects of Invention

According to the present invention, pieces of information sequentially transmitted can be decoded and reproduced in an appropriate order.

DESCRIPTION OF EMBODIMENTS

A First Example Embodiment

Figure 1:
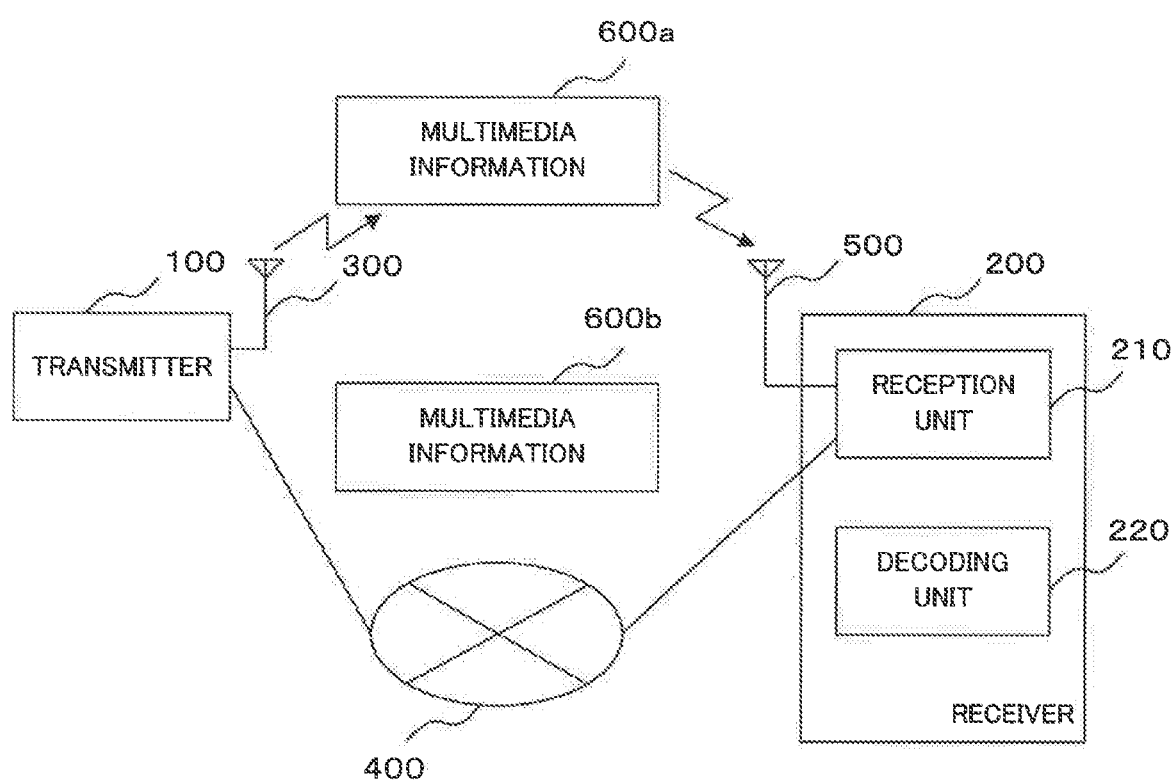
FIG. 1 is a block diagram illustrating a configuration example of a transmission/reception system of a first example embodiment of the present invention.

A transmission/reception system of a first example embodiment of the present invention will be described with reference to the accompanying drawings. FIG. 1 is a block diagram illustrating a configuration example of the transmission/reception system of the first example embodiment of the present invention. As illustrated in FIG. 1, the transmission/reception system of the first example embodiment of the present invention includes: a transmitter 100 that transmits information; and a receiver 200 that receives information. It should be noted that the transmitter 100 and the receiver 200 may be realized by, for example, a computer such as a CPU (Central Processing Unit) or the like mounted with a single circuit or a plurality of circuits, the computer executing processing in accordance with program control. Specifically, the transmitter 100 and the receiver 200 are mounted with, for example, software for realizing respective operations described below. Then, the transmitter 100 and the receiver 200 may be configured to realize the respective operations described below by executing processing in accordance with program control of the software.

Hereinafter, description will be made, assuming that a leap second that is a time to be inserted or eliminated is one second, but the time may be shorter or longer than one second.

The transmitter 100 is installed by, for example, a broadcaster and transmits television program information and the like. The receiver 200 is installed by, for example, a viewer who views video and audio based on television program information and the like and receives the television program information and the like transmitted by the transmitter 100. Then, the receiver 200 presents (referred to also as reproduces or outputs) video and audio based on the received television program information and the like. Here, the video and audio presented in the receiver 200 include information of application software including a so-called app and various pieces of information such as captions, data, and the like. Further, an apparatus that receives information transmitted by the transmitter 100 and an apparatus that decodes the information received by the apparatus may be provided separately. Furthermore, separately from the apparatus that decodes the information, an apparatus that presents video, audio, and the like based on the decoded information may be provided. In other words, means for realizing the respective operations described below may be apparatuses separate from each other.

As illustrated in FIG. 1, the transmitter 100 transmits multimedia information 600a by radio waves via an antenna 300. Further, the transmitter 100 transmits multimedia information 600b via a communication line (which may be a communication network such as the Internet or the like) 400. Then, the receiver 200 receives the multimedia information 600a via an antenna 500. Further, the receiver 200 receives the multimedia information 600b via the communication line 400. The pieces of multimedia information 600a and 600b each are information including television program information and the like, and details thereof will be described later.

Here, the receiver 200 includes, for example, a reception unit 210 that receives pieces of multimedia information 600a and 600b and a decoding unit 220 that executes decoding processing to be described later.

Pieces of multimedia information 600a and 600b transmitted/received between the transmitter 100 and the receiver 200 will be described below.

Figure 2:
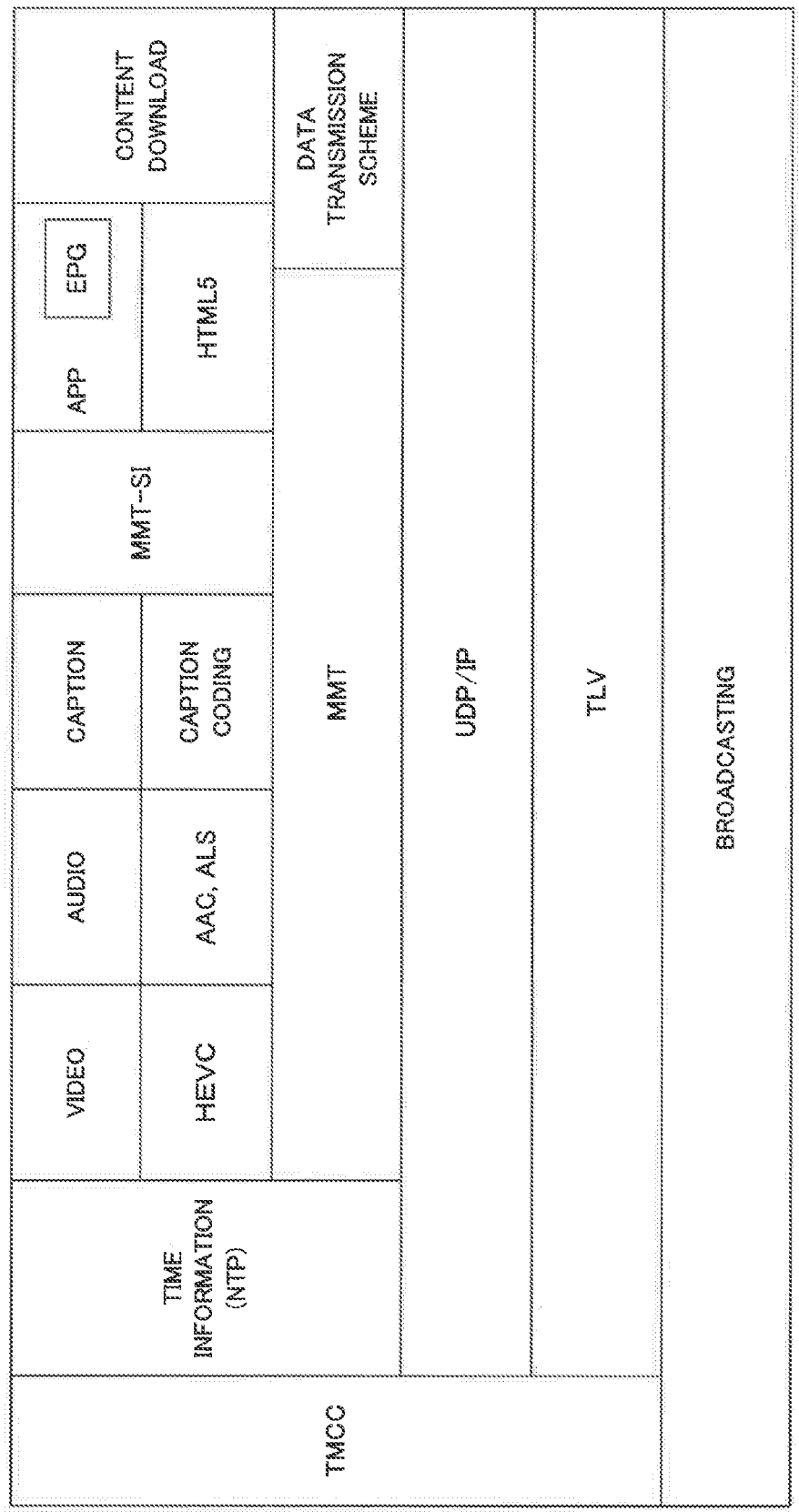
FIG. 2 is a protocol stack diagram illustrating a protocol configuration of multimedia information transmitted/received by radio waves.

FIG. 2 is a protocol stack diagram illustrating a protocol configuration of multimedia information 600a transmitted/received by radio waves. As illustrated in FIG. 2, the multimedia information 600a includes an IP (Internet Protocol) packet of the TLV (Type Length Value) packet format and TMCC (Transmission and Multiplexing Configuration and Control) that is a control signal.

Further, the IP packet of the TLV format (hereinafter, referred to also as the TLV packet) includes time information based on NTP and television program information and the like based on MMT.

Figure 3:
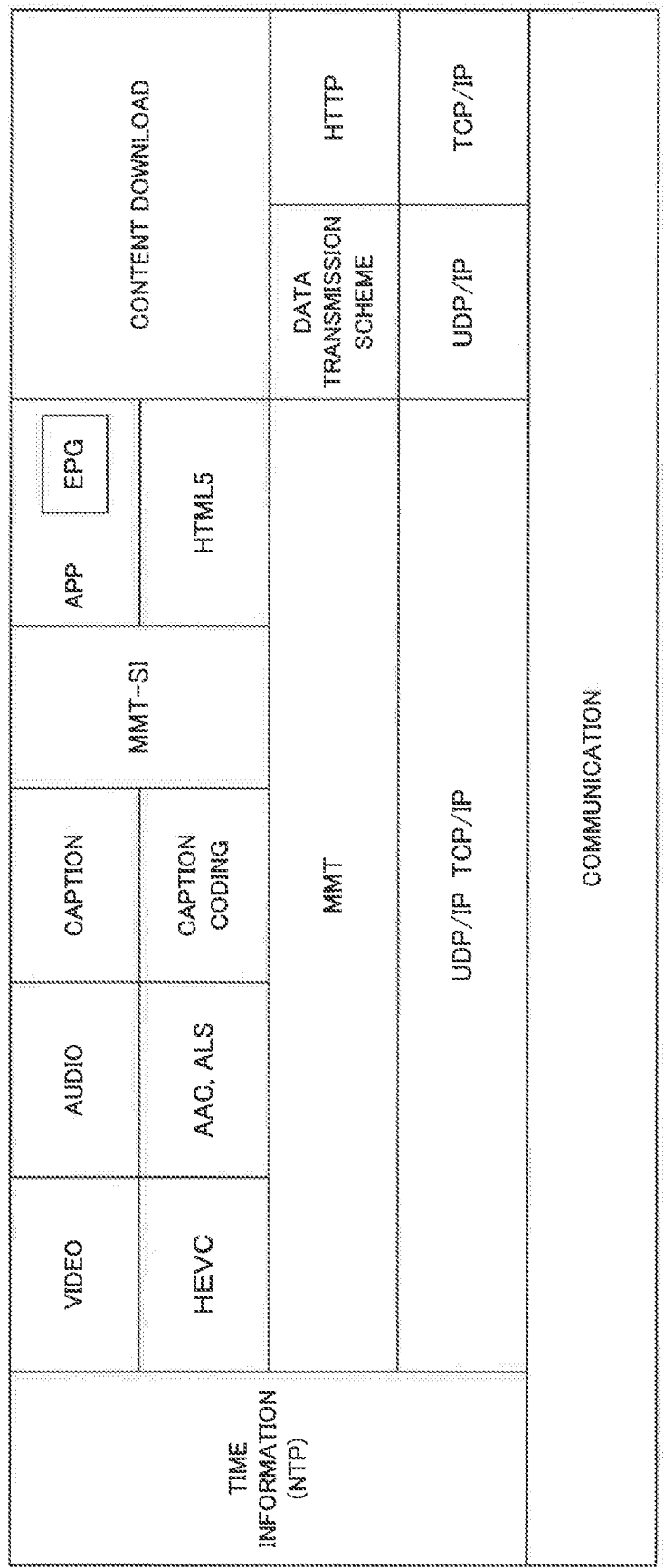
FIG. 3 is a protocol stack diagram illustrating a protocol configuration of multimedia information transmitted/received via a communication line.

FIG. 3 is a protocol stack diagram illustrating a protocol configuration of multimedia information 600b transmitted/received via the communication line 400. As illustrated in FIG. 3, the multimedia information 600b includes an IP packet in accordance with television program information and the like and time information based on NTP. The IP packet includes television program information and the like based on MMT.

Video information and audio information of the television program information and the like included in the pieces of multimedia information 600a and 600b are described below. Here, the video information refers to information based on video signals. Further, the audio information refers to information based on audio signals. The transmitter 100 codes video signals and audio signals and stores the coded signals in an MFU (Media Fragment Unit). Then, data for, for example, 1 GOP (Group Of Picture) based on a plurality of MFUs configures an MPU (Media Processing Unit), and the transmitter 100 stores MFUs in an MMTP (MMT Protocol) payload and transmits the MFUs as an IP packet by an MMTP packet. The video signals and the audio signals are converted into various types of formats by coding or packetization, but in the present example, information based on these video signals and information based on these audio signals to be changed to various types of formats will be collectively referred to as video information and audio information. Here, information including video information and audio information to be presented to a viewer will be referred to also as content information.

The MMTP packet includes a header portion referred to as an MMTP header and a payload portion referred to as an MMTP payload. The MMTP header includes timestamp information in which, for example, a time when a top bite of this MMTP packet is output from a transmission entity is indicated by a short-form NTP time stamp indicated in RFC (Request For Comments) 5905.

Further, the MMTP header generated by the transmitter 100 stores packet_counter information. The packet-counter information includes a packet_counter that indicates an order of MMTP packets in the same IP data flow. Here, in the present example embodiment, the packet_counter information is equivalent to order information.

The content information is included in the MMTP payload. Further, the MMTP payload stores MPU_presentation_time information that indicates a time (hereinafter, referred to as a presentation time) causing the receiver 200 to output video and audio based on content information included in an MMTP packet including own information. The receiver 200 executes processing so as to output the video and audio based on the content information at the presentation time indicated by the MPU_presentation_time information. Here, in the present example, the presentation time will be described as being expressed by the NTP time stamp format, but another format is employable when being a format capable of expressing a time.

Further, the MMTP payload generated by the transmitter 100 stores packet ID information. The packet ID information refers to information that indicates a packet ID for identifying, for example, an MMTP packet configuring one asset from an MMTP packet configuring another asset.

Here, for the time information, a flag in accordance with adjustment for causing Coordinated Universal Time to be close to Universal Time is prepared. Specifically, when, for example, a leap second is inserted, for time information transmitted from a predetermined prior time of a timing of inserting the leap second to the timing, a leap second insertion flag in accordance with insertion of a leap second is set. Here, the predetermined prior time is, for example, one month before the timing. Further, the leap second insertion flag in the present example is equivalent to adjustment information. Furthermore, a timing of setting a flag, a reset timing, and a type of a flag to be set are not limited thereto, and a flag in accordance with another timing or another type may be used.

Figure 4:
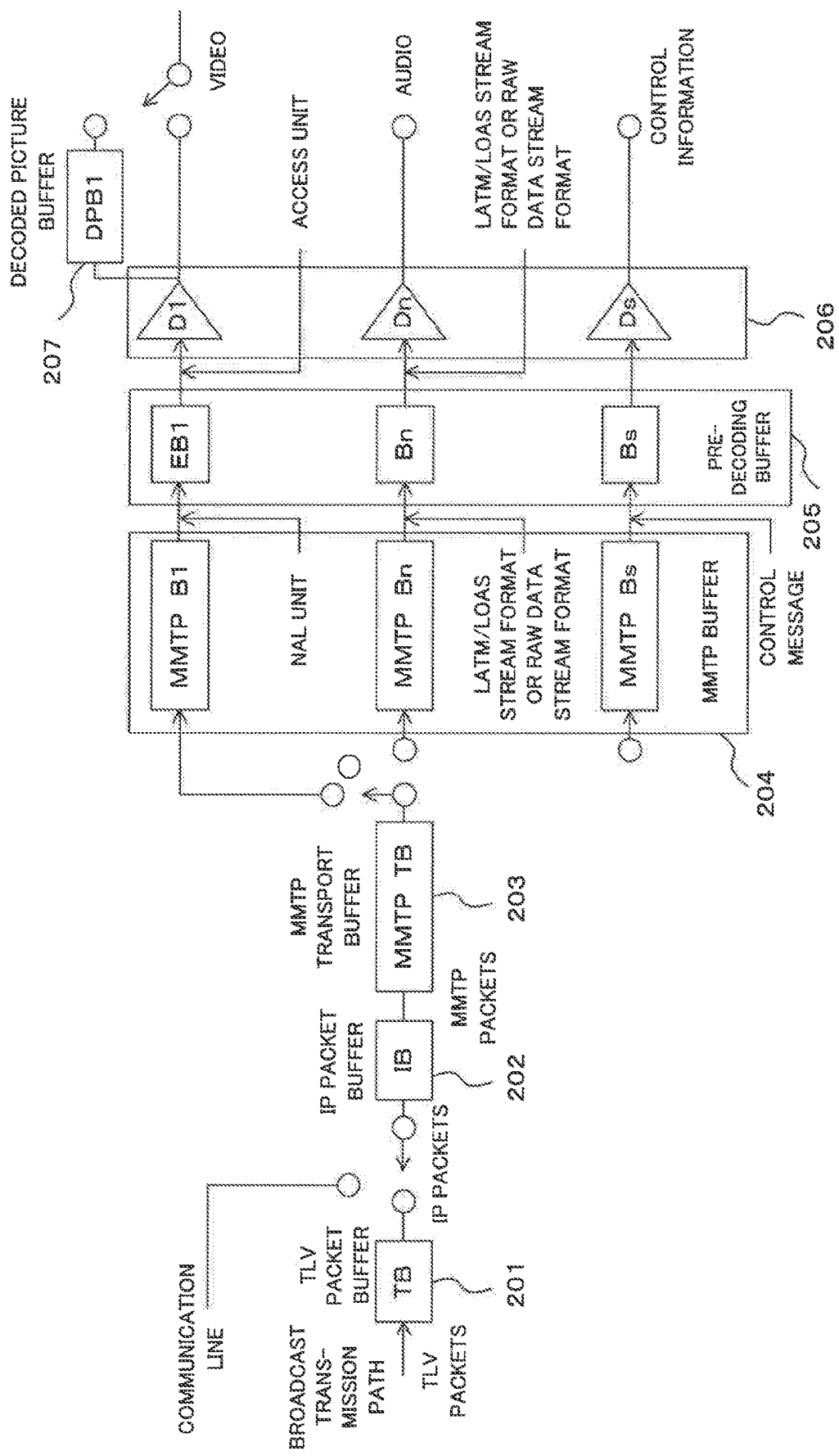
FIG. 4 is a block diagram illustrating a configuration example of a reception buffer in a receiver.

Next, a configuration of the receiver 200 will be described. FIG. 4 is a block diagram illustrating a configuration example of a reception buffer in the receiver 200.

In the example illustrated in FIG. 4, the reception buffer of the receiver 200 includes a TLV packet buffer 201, an IP packet buffer 202, an MMTP transport buffer 203, an MMTP buffer 204, a predecoding buffer 205, a decoder 206, and a decoded picture buffer 207.

A TLV packet extracted from multimedia information 600a transmitted by radio waves is input to the TLV packet buffer 201 and temporality stored therein.

An IP packet based on the TLV packet temporarily stored in the TLV packet buffer 201 is input to the IP packet buffer 202 and temporarily stored therein. Further, an IP packet of multimedia information 600b transmitted from the transmitter 100 is input to the IP packet buffer 202 via the communication line 400 and temporarily stored therein.

In the MMTP transport buffer 203, the IP packet, being changed to MMTP, temporarily stored in the IP packet buffer 202 is classified with respect to each asset such as video, audio, and the like on the basis of packet ID information included in an MMTP header. Then, the classified IP packets are input to the MMTP buffer 204 in accordance with the classification result.

In the example illustrated in FIG. 4, the MMTP buffer 204 includes MMTP B1, MMTP Bn, and MMTP Bs. Then, an IP packet of an asset for video is input to MMTP B1. Further, an IP packet of an asset for audio is input to MMTP Bn. Further, an IP packet of an asset for a control message is input to MMTP Bs and temporarily stored therein.

The IP packet of an asset for video input to MMTP B1 is restored to data of an NAL (Network Abstraction Layer) unit and temporarily stored in MMTP B1.

The IP packet of an asset for audio input to MMTP Bn is restored to data of the LATM (Low-overhead MPEG-4 Audio Transport Multiplex)/LOAS (Low Overhead Audio Stream) format and temporarily stored in MMTP Bn. Herein, description is made, assuming that the IP packet of an asset for audio is restored to data of the LATM/LOAS format as one example, but a configuration may be made so that restoration to data of another format is performed.

Then, each piece of data and the control message temporarily stored in the MMTP buffer 204 are input to the predecoding buffer 205.

As illustrated in FIG. 4, the predecoding buffer 205 includes an elementary stream buffer EB1 for an elementary stream 1, a main buffer Bn for an elementary stream n, and a main buffer Bs for system information.

The data of an NAL unit temporarily stored in MMTP B1 is input to the elementary stream buffer EB1. Here, the elementary stream buffer EB1 is, for example, a CPB (Coded Picture Buffer).

The data of the LATM/LOAS format temporarily stored in MMTP Bn is input to the main buffer Bn and temporarily stored therein. Here, data of the Raw Data Stream format may be input to the main buffer Bn and temporarily stored therein. Herein, description is made, assuming that data of the LATM/LOAS format as one example is restored to data of the Raw Data Stream format as one example, but a configuration may be made so that data of another format is restored to data of further another format.

The control message temporarily stored in MMTP Bs is input to the main buffer Bs and temporarily stored therein.

Each piece of data and the control message input to the predecoding buffer 205 are output to the decoder 206 and decoded at a timing in accordance with a DTS (Decode Time Stamp), and temporarily stored. The DTS will be described later.

As illustrated in FIG. 4, the decoder 206 includes a video decoder D1, an audio decoder Dn, and a system decoder Ds.

The data output from the elementary stream buffer EB1 to the decoder 206 is decoded to video data by the video decoder D1. Then, the decoded video data is input, as needed, to the decoded picture buffer 207 and temporarily stored therein.

Further, the data output from the main buffer Bn to the decoder 206 is decoded to audio data by the audio decoder Dn.

Furthermore, the control message output from the main buffer Bs to the decoder 206 is decoded to control information by the system decoder Ds. The control information is used to control each unit in the receiver 200.

The DTS (referred to also as the decode time) is described below. A presentation time and a decode time of video signals or audio signals are provided using an MPU time stamp descriptor and an MPU extended time stamp descriptor.

Figure 5:
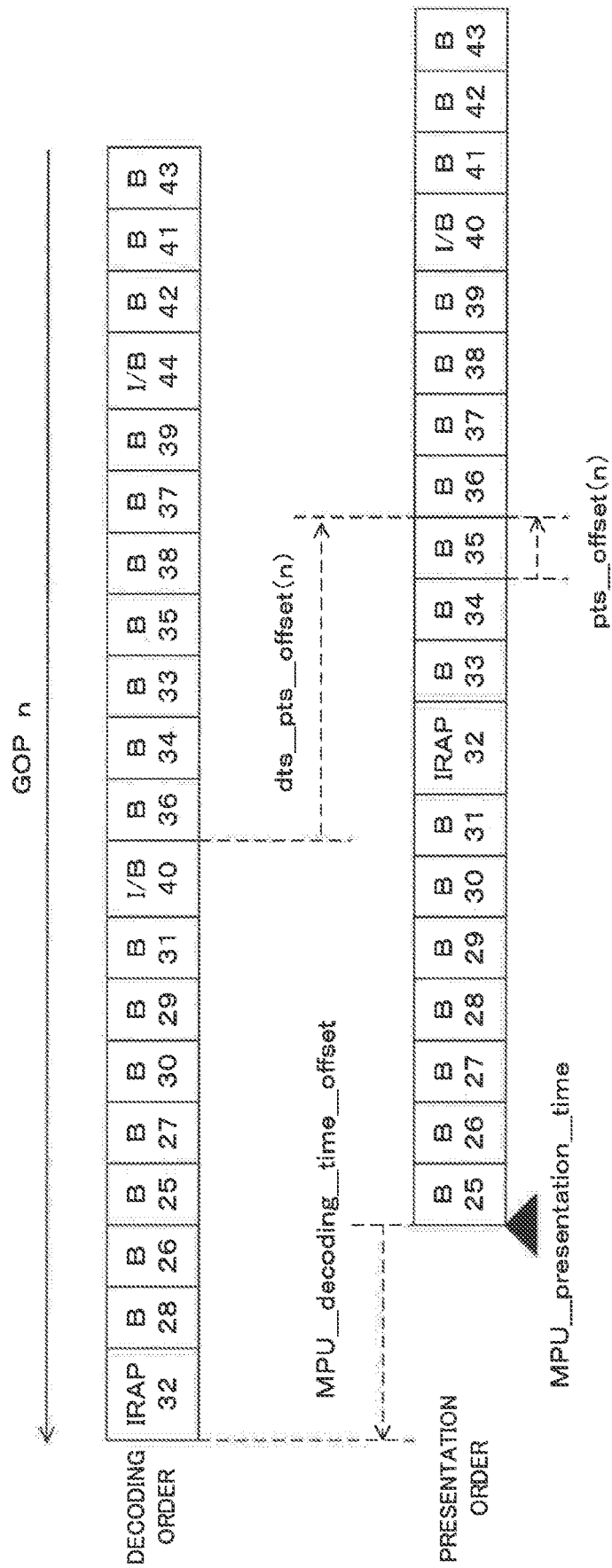
FIG. 5 is an illustrative diagram illustrating an outline of access units in an MPU, and presentation times and decoding times thereof.

FIG. 5 is an illustrative diagram illustrating an outline of access units in an MPU, and presentation times and decoding times thereof. FIG. 5 schematically illustrates bit streams configuring the MPU for respective access units that are units of the same presentation time. Here, in the example illustrated in FIG. 5, a bit stream configuring each access unit configures a B frame and an I frame or a B frame (hereinafter, described as an I/B frame). In FIG. 5, IRAP (Intra Random Access Point) refers to a bit stream at a timing when coding is started. Further, in the example illustrated in FIG. 5, an I/B frame is disposed at intervals of seven frames, and frames therebetween are B frames.

In the example illustrated in FIG. 5, each access unit is previously assigned with a number in a presentation order. In FIG. 5, using numbers assigned to "B," "I/B," and "IRAP," a presentation order of respective access units is illustrated. Here, the example illustrated in the upper side of FIG. 5 illustrates that the respective access units have been decoded in an order different from the presentation order.

As described above, the MMTP payload stores MPU_presentation_time information. Using the MPU_presentation_time information, a presentation time of an access unit to be presented first in the MPU is indicated in the NTP time stamp format. Therefore, in FIG. 5, video based on a B frame of a 25th access unit is presented at a time indicated by the MPU_presentation_time information. Here, the MPU_presentation_time information is equivalent to presentation time information.

Then, a DTS of an nth access unit in an MPU is calculated by the following equation.

$$DTS(n) = MPU\_Presentation\_time - MPU\_decoding\_time\_offset/timescale + \Sigma pts\_offset(k)/timescale \quad (1)$$

wherein MPU_Presentation_time represents a time indicated in the NTP time stamp format by MPU_presentation time information, MPU_decoding_time_offset represents a difference value between a decode time of an access unit decoded first and a presentation time of an access unit presented first, pts_offset represents a difference value between a presentation time of an immediately prior access unit and a presentation time of the current access unit in a presentation order in the same MPU, timescale represents a value indicating a unit of these times, and k represents a number of access units in the MPU.

Here, a PTS (Presentation Time Stamp) that is a presentation time of an nth access unit in an MPU is calculated by the following equation.

$$PTS(n)=DTS(n)+dts\_pts\_offset(n)/timescale \quad (2)$$

wherein dts_pts_offset(n) represents a difference value between a decode time and a presentation time of an nth access unit in an MPU.

The transmitter 100 transmits each piece of information so as to be received by the receiver 200 before a start of decoding an MPU in the receiver 200 so that the receiver 200 can calculate a DTS and a PTS using equation (1) and equation (2).

Next, operations of the transmitter 100 and the receiver 200 in the example embodiment of the present invention will be described. Initially, operations of the transmitter 100 and the receiver 200 upon inserting a leap second in order to cause Coordinated Universal Time to be close to Universal Time are described below.

Figure 6:
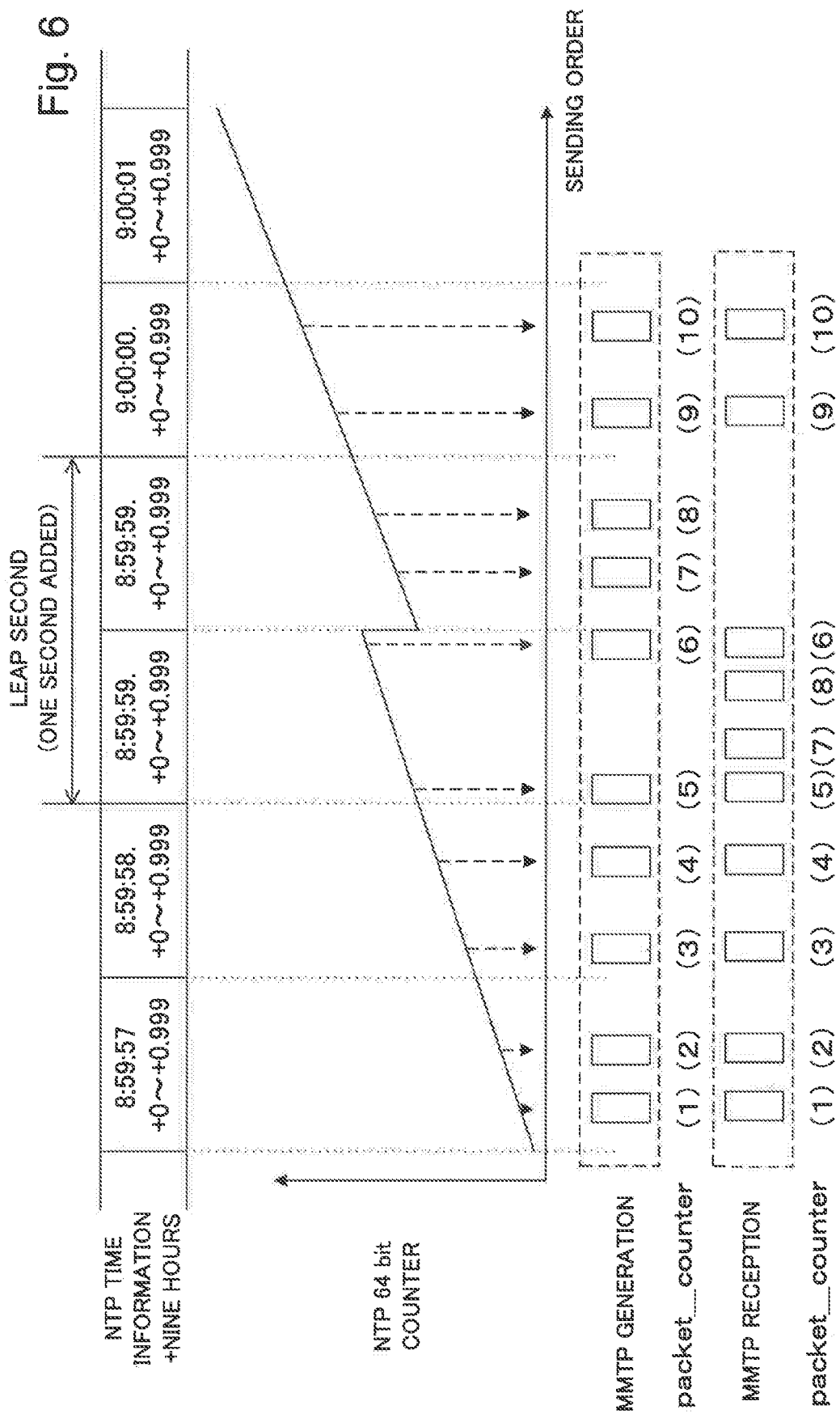
FIG. 6 is an illustrative diagram illustrating an example of MMTP packets transmitted/received when a leap second is inserted.

FIG. 6 is an illustrative diagram illustrating an example of MMTP packets transmitted/received when a leap second is inserted.

In the example illustrated in FIG. 6, 8:59:59 comes again after 8:59:59. In other words, between 8:59:59 and 9:00:00, 8:59:59 is inserted as a leap second.

Here, a value of a time stamp of NTP (indicated as an NTP 64 bit counter in FIG. 6) increases as time passes. Therefore, a value of a time stamp of NTP increases as time passes from 8:59:59. 0 to 8:59:59. 999 of a first time. However, when 8:59:59 is inserted between 8:59:59 and 9:00:00 of the first time as a leap second, a value of a time stamp of NTP at 8:59:59. 0 of a second time after 8:59:59. 999 of the first time decreases to the value at 8:59:59. 0 of the first time. The value of the time stamp of NTP increases again as time passes from 8:59:59. 0 to 8:59:59. 999 of the second time.

The transmitter 100 generates and transmits MMTP packets sequentially also during that period. In the example illustrated in the column of MMTP generation in FIG. 6, MMTP packets in which values indicated by packet_counter information are 1 to 10 are sequentially generated and transmitted. Each MMTP packet includes timestamp information in a header portion and MPU_presentation_time information in which a presentation time is indicated by a value of a time stamp of NTP in a payload portion.

The column of MMTP reception in FIG. 6 illustrates an example in which respective MMTP packets are disposed on the basis of values of time stamps indicated by timestamp information included in the respective MMTP packets. In the example illustrated in the column of MMTP reception in FIG. 6, MMTP packets in which values indicated by packet_counter information are 1 to 5, 9, and 10 are disposed in an order of generation and transmission by the transmitter 100.

However, in the example illustrated in the column of MMTP reception in FIG. 6, an order of MMTP packets generated and transmitted from 8:59:59. 0 to 8:59:59. 999 of the first time and the second time is not matched with the order of generation and transmission by the transmitter 100. Specifically, in the example illustrated in the column of MMTP reception in FIG. 6, an MMTP packet in which a value indicated by packet_counter information is "7" and an MMTP packet in which a value indicated by packet_counter information is "8" are disposed before an MMTP packet in which a value indicated by packet_counter information is "6".

Therefore, when the receiver 200 executes processing for decoding and presenting MMTP packets in an order based on values of time stamps indicated by timestamp information over a period before and after inserting a leap second, the processing is executed in an order different from an IP data flow.

Figure 7:
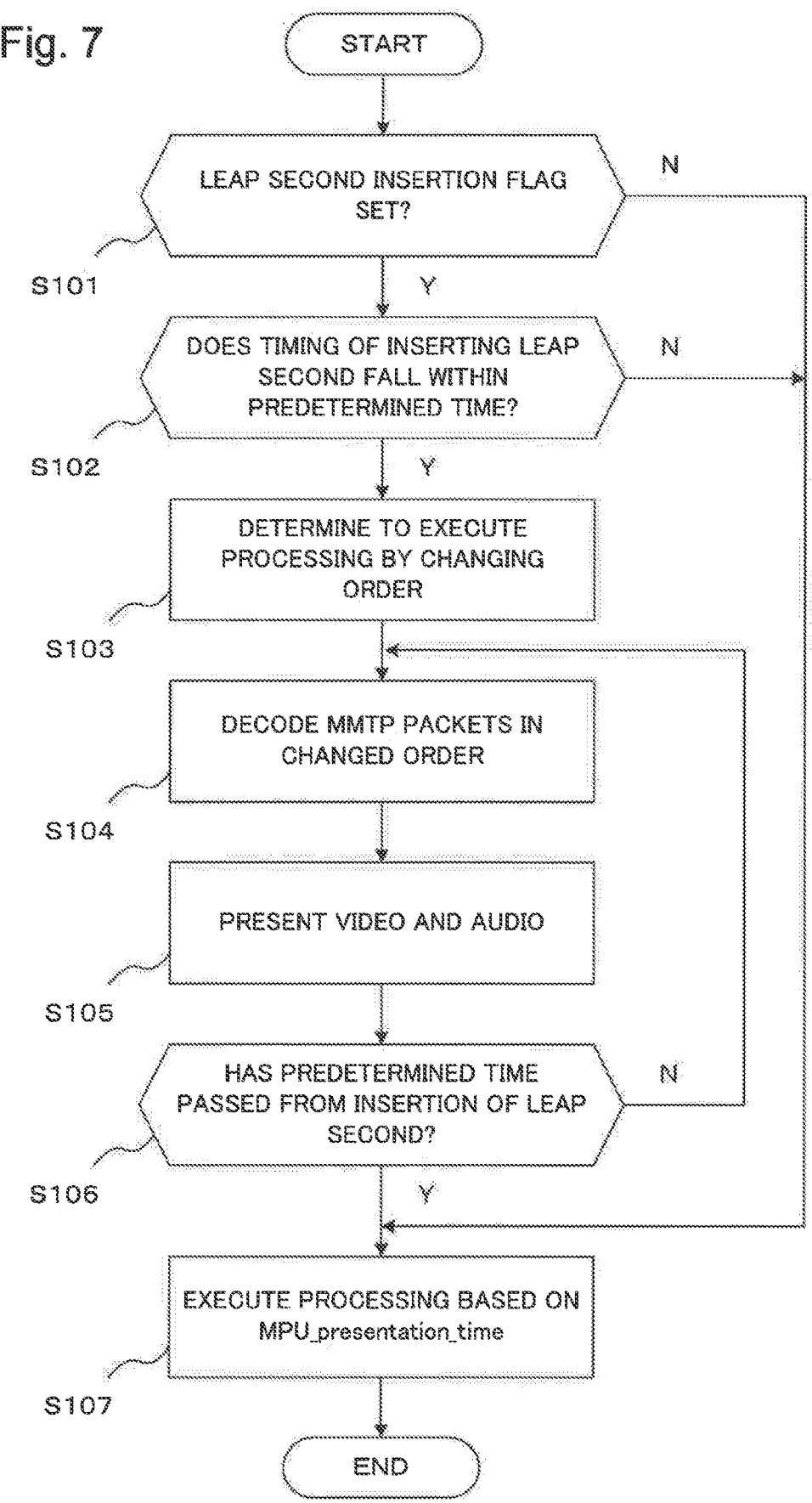
FIG. 7 is a flowchart illustrating an example in which a receiver changes an order of MMTP packets transmitted/received when a leap second is inserted and processes the MMTP packets.

FIG. 7 is a flowchart illustrating an example in which the receiver 200 changes an order of MMTP packets transmitted/received when a leap second is inserted and processes the MMTP packets.

As in the example illustrated in FIG. 6, MMTP packets in which values indicated by packet_counter information are 1 to 10 are transmitted. Then, when a leap second insertion flag is set for time information included in the MMTP packets (Y of step S101) and a timing of inserting a leap second falls within a predetermined time (Y of step S102), the receiver 200 moves to processing of step S103, and when the above case is not realized (N of step S101 or N of step S102), the receiver 200 moves to processing of step S107. In the processing of step S107, the receiver 200 executes normal processing that processes MMTP packets used for presentation in an order based on timestamp information (step S107). Then, each MMTP packet is subjected to processing for decoding and presentation in the order based on the timestamp information.

Further, the receiver 200 determines to execute processing by changing an order for the order based on the timestamp information in the processing of step S103 (step S103).

Figure 10:
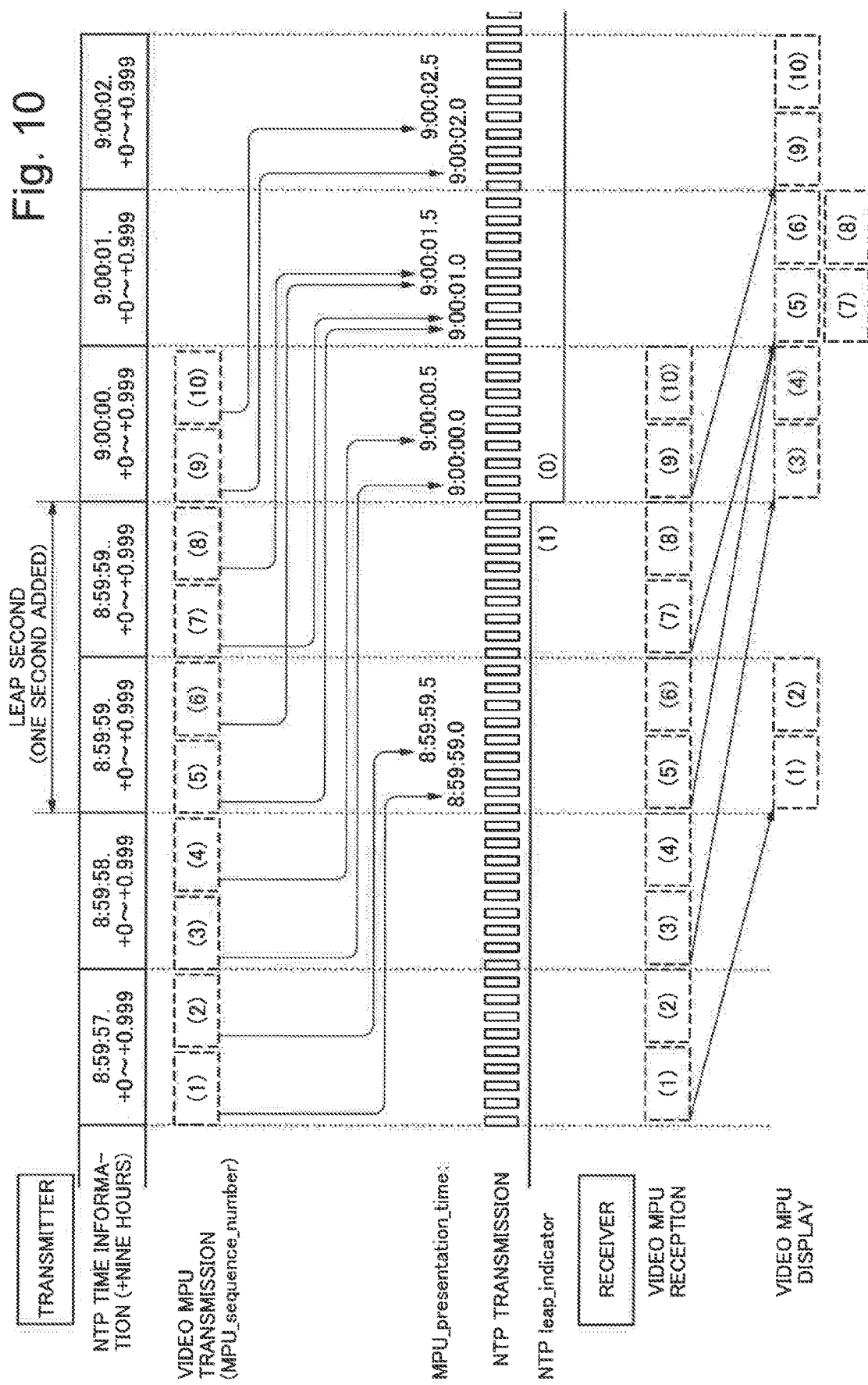
FIG. 10 is an illustrative diagram illustrating an example of MPUs transmitted/received when a leap second is inserted.
Figure 11:
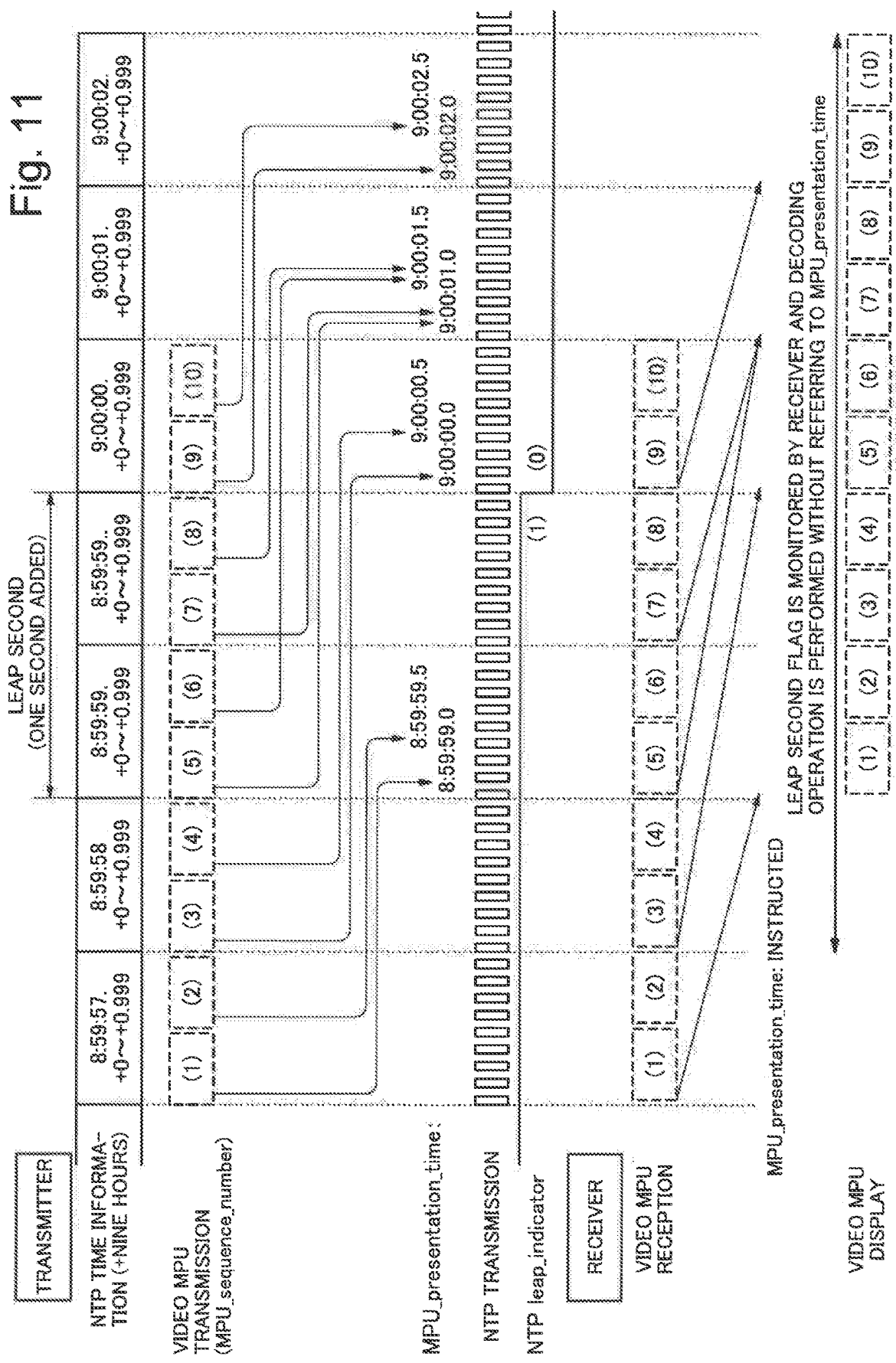
FIG. 11 is an illustrative diagram illustrating an example in which a receiver processes MPUs transmitted/received when a leap second is inserted.

Here, the leap second insertion flag is indicated as NTP leap_indicator in FIGS. 10 and 11 and it is reset at 9:00:00. 0. Specifically, for example, a leap second insertion flag is set for time information included in MMTP packets transmitted before 9:00:00. 0, but no leap second insertion flag is set for time information included in MMTP packets transmitted after 9:00:00. 0.

Then, in the example illustrated in FIG. 6, the receiver 200 sequentially decodes, from 8:59:57. 0, an MMTP packet in which packet_counter information indicates a value obtained by adding 1 to a value indicated by packet_counter information of an MMTP packet decoded immediately therebefore (step S104).

Then, respective MMTP packets generated and transmitted by the transmitter 100 in an order of values indicated by packet_counter information are decoded on the basis of the values indicated by the packet_counter information in an ascending order of the values as a specific example herein, and video and the like based on the respective MMTP packets are presented (step S105). Here, description is made, assuming that "on the basis of the values" means an ascending order of the values in the present example, but another order such as a descending order of the values or the like is employable. Further, a unit for decoding MMTP packets is, for example, an access unit, but the MMTP packets may be decoded in another unit.

When a predetermined time has not passed from insertion of the leap second (N of step S106), the receiver 200 moves to the processing of step S104.

Then, by repeating the processing of steps S104 and S105, respective MMTP packets are decoded on the basis of values indicated by packet_counter information. Then, video and the like based on the respective MMTP packets are sequentially presented.

When the predetermined time has passed from insertion of the leap second (Y of step S106), the receiver 200 moves to normal processing for determining an order of MMTP packets used for presentation on the basis of timestamp information (step S107).

The determination in the processing of step S106 may be performed on the basis of whether a predetermined time has passed from a time of not setting a leap second insertion flag.

Here, "the predetermined time" in the processing of steps S102 and S106 is, for example, three seconds. Therefore, the processing of steps S104 and S105 is repeated over three seconds each before and after a timing of inserting a leap second. Specifically, the processing of steps S104 to S106 is repeated, for example, from 8:59:57 that is three seconds before 9:00:00 when a leap second is inserted to 9:00:03 that is three seconds after 9:00:00 when the leap second has been inserted.

Therefore, in the present example, the receiver 200 executes processing based on values indicated by packet_counter information over three seconds before and after a timing of inserting a leap second and executes normal processing of step S107 for a period other than the above.

According to the present example embodiment, the receiver 200 processes MMTP packets on the basis of values indicated by packet_counter information for a period in accordance with a timing of inserting a leap second. Therefore, a problem caused due to insertion of a leap second can be prevented from occurring.

Specifically, it is possible that when values indicated by packet_counter information are used to determine an order of processing for MMTP packets for a period in accordance with a timing of inserting a leap second, the respective MMTP packets are decoded in an appropriate order and video and the like based on the MMTP packets are presented in an appropriate order.

Further, even when the receiver 200 receives packets in accordance with television program information and the like transmitted via a communication line and packets in accordance with television program information and the like transmitted by radio waves, decoding can be performed in an appropriate order in accordance with a processing order determined by a sending side.

Furthermore, even when the receiver 200 receives packets in accordance with television program information and the like transmitted via a communication line in an order different from a transmission order, decoding can be performed in an appropriate order in accordance with a processing order determined by a sending side.

Figure 8:
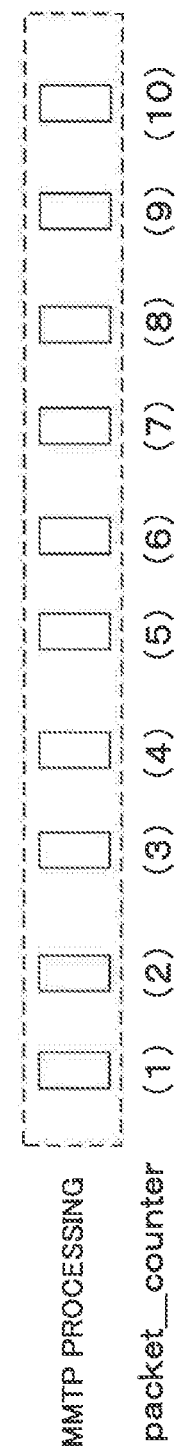
FIG. 8 is an illustrative diagram illustrating decode timings of respective MMTP packets determined by additional processing.

Here, in steps S104 and S105, additional processing may be further executed. Specifically, the receiver 200 decodes respective MMTP packets by processing of step S104, and in addition, for example, at a timing in accordance with a value of pts_offset used in the calculation of equation (1) in processing of step S107 of an immediately prior stage. Specifically, timings of decoding respective MMTP packets configuring the access units are determined so as to decode MMTP packets configuring the access units, for example, at time intervals in accordance with a value of pts_offset. FIG. 8 is an illustrative diagram illustrating decode timings of respective MMTP packets determined by the additional processing. In the example illustrated in FIG. 8, the respective MMTP packets are decoded at time intervals in accordance with a value of pts_offset in an order based on packet_counter values. Then, in addition to the processing of step S105, the receiver 200 determines timings of presenting video and audio in accordance with the respective MMTP packets configuring the access units, so as to present video and audio in accordance with MMTP packets configuring the access units, for example, at time intervals in accordance with a value of pts_offset. Then, the receiver 200 presents the video and audio at the determined timings.

Here, in general, in a series of MPUs, a value of pts_offset is not changed. Therefore, using the additional processing, it is possible that on the basis of a calculation result in processing of step S107 of the last time and a value of pts_offset used for the calculation, timings of decoding MMTP packets of access units from the next time are determined, and thereby the respective MMTP packets are decoded at appropriate timings and video and the like based on the MMTP packets are presented at appropriate timings.

Figure 9:
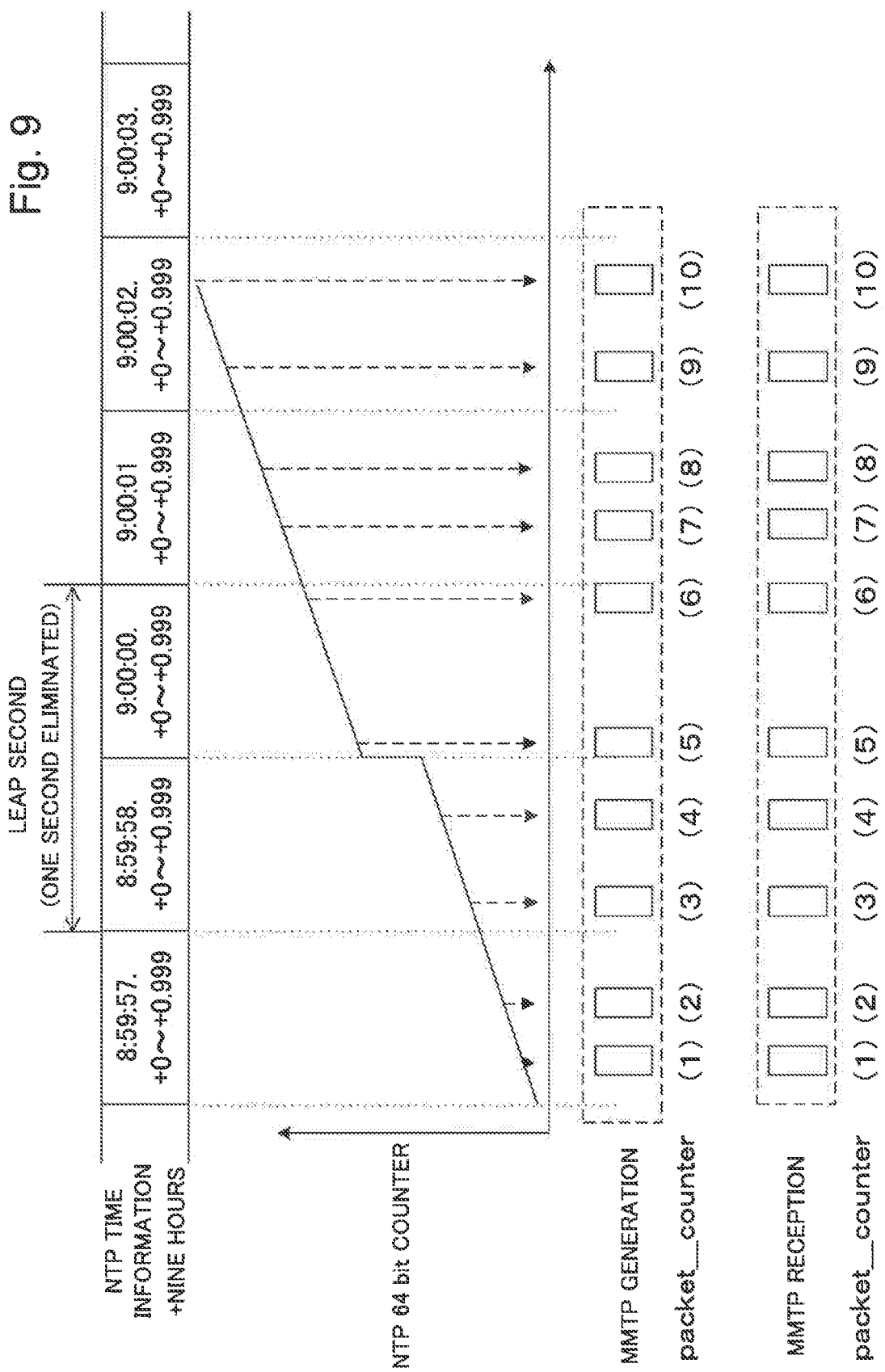
FIG. 9 is an illustrative diagram illustrating an example of MMTP packets transmitted/received when a leap second is eliminated.

It should be noted that in adjustment of Coordinated Universal Time, a leap second is eliminated in some cases. FIG. 9 is an illustrative diagram illustrating an example of MMTP packets transmitted/received when a leap second is eliminated. As illustrated in the column of MMTP generation of FIG. 9, respective MMTP packets transmitted/received in the present example include packet_counter information that indicates a transmission order.

Now, as illustrated in the column of MMTP reception of FIG. 9, when a leap second is eliminated, respective MMTP packets transmitted by the transmitter 100 are received by the receiver 200 in a transmission order indicated by packet_counter information.

Therefore, when an NTP time of the receiver 200 follows leap second elimination, special processing is unnecessary.

A Second Example Embodiment

Next, a transmission/reception system of a second example embodiment of the present invention will be described. In the transmission/reception system of the first example embodiment described above, an order of processing MMTP packets is changed on the basis of values indicated by packet_counter information. In contrast, in the transmission/reception system of the second example embodiment of the present invention, an order of processing MPUs is changed on the basis of values indicated by mpu_sequence_number information. Now, an MMTP payload generated by the transmitter 100 stores mpu_sequence_number information. The mpu_sequence_number information refers to information that indicates an mpu_sequence_number that is a sequence number assigned to identify each MPU from other MPUs for each same asset. In the present example embodiment, the mpu_sequence_number information is equivalent to order information.

FIG. 10 is an illustrative diagram illustrating an example of MPUs transmitted/received when a leap second is inserted.

In the present example, it is assumed that respective MPUs are sequentially transmitted at intervals of 0.5 seconds. Then, in the example illustrated in FIG. 10, at 8:59:57. 0, respective MMTP packets of an MPU in which a value indicated by mpu_sequence_number information (indicated as MPU_sequence_number in FIG. 10) is "1" are transmitted. Further, at 8:59:57. 5, respective MMTP packets of an MPU in which a value indicated by mpu_sequence_number information is "2" are transmitted. At 8:59:58. 0, respective MMTP packets of an MPU in which a value indicated by mpu_sequence_number information is "3" are transmitted. Further, at 8:59:58. 5, respective MMTP packets of an MPU in which a value indicated by mpu_sequence_number information is "4" are transmitted. At 8:59:59. 0 of a first time, respective MMTP packets of an MPU in which a value indicated by mpu_sequence_number information is "5" are transmitted. Further, at 8:59:59. 5 of a first time, respective MMTP packets of an MPU in which a value indicated by mpu_sequence_number information is "6" are transmitted. At 8:59:59. 0 of a second time, respective MMTP packets of an MPU in which a value indicated by mpu_sequence_number information is "7" are transmitted. Further, at 8:59:59. 5 of a second time, respective MMTP packets of an MPU in which a value indicated by mpu_sequence_number information is "8" are transmitted. At 9:00:00. 0, respective MMTP packets of an MPU in which a value indicated by mpu_sequence_number information is "9" are transmitted. Further, at 9:00:00. 5, respective MMTP packets of an MPU in which a value indicated by mpu_sequence_number information is "10" are transmitted.

Here, it is assumed that a value in accordance with a presentation time indicated by MPU_presentation_time information indicates a value in accordance with a time after two seconds from a transmission time.

Then, in the example illustrated in FIG. 10, a presentation time in accordance with a value indicated by MPU_presentation_time information of MMTP packets of an MPU in which a value indicated by mpu_sequence_number information is "1" is 8:59:59. 0. Further, a presentation time in accordance with a value indicated by MPU_presentation_time information of MMTP packets of an MPU in which a value indicated by mpu_sequence_number information is "2" is 8:59:59. 5. A presentation time in accordance with a value indicated by MPU_presentation_time information of MMTP packets of an MPU in which a value indicated by mpu_sequence_number information is "3" is 9:00:00. 0. Further, a presentation time in accordance with a value indicated by MPU_presentation_time information of MMTP packets of an MPU in which a value indicated by mpu_sequence_number information is "4" is 9:00:00. 5. A presentation time in accordance with a value indicated by MPU_presentation_time information of MMTP packets of an MPU in which a value indicated by mpu_sequence_number information is "5" is 9:00:01. 0. Further, a presentation time in accordance with a value indicated by MPU_presentation_time information of MMTP packets of an MPU in which a value indicated by mpu_sequence_number information is "6" is 9:00:01. 5. A presentation time in accordance with a value indicated by MPU_presentation_time information of MMTP packets of an MPU in which a value indicated by mpu_sequence_number information is "7" is 9:00:01. 0. Further, a presentation time in accordance with a value indicated by MPU_presentation_time information of MMTP packets of an MPU in which a value indicated by mpu_sequence_number information is "8" is 9:00:01. 5. A presentation time in accordance with a value indicated by MPU_presentation_time information of MMTP packets of an MPU in which a value indicated by mpu_sequence_number information is "9" is 9:00:02. 0. Further, a presentation time in accordance with a value indicated by MPU_presentation_time information of MMTP packets of an MPU in which a value indicated by mpu_sequence_number information is "10" is 9:00:02. 5.

Therefore, with respect to the MMTP packets of the MPU in which a value indicated by mpu_sequence_number information is "5" and the MMTP packets of the MPU in which a value indicated by mpu_sequence_number information is "7," each of the presentation times in accordance with a value indicated by MPU_presentation_time information is 9:00:01. 0. Therefore, there are two MPUs in which a presentation time in accordance with a value indicated by MPU_presentation_time information is 9:00:01. 0.

Further, with respect to the MMTP packets of the MPU in which a value indicated by mpu_sequence_number information is "6" and the MMTP packets of the MPU in which a value indicated by mpu_sequence_number information is "8," each of the presentation times in accordance with a value indicated by MPU_presentation_time information is 9:00:01. 5. Therefore, there are two MPUs in which a presentation time in accordance with a value indicated by MPU_presentation_time information is 9:00:01. 5.

In contrast, due to insertion of 8:59:59 as a leap second, while processing from 8:59:59. 0 to 8:59:59. 999 has been repeated twice, there are only two MPUs in which a presentation time in accordance with a value indicated by MPU_presentation_time information is a time between 8:59:59. 0 and 8:59:59. 999. Then, there is no MPU used for presentation between 8:59:59. 0 and 8:59:59. 999 of a second time.

In other words, when processing procedures of MPUs used for presentation are determined on the basis of set MPU_presentation_time information, a problem may occur upon inserting a leap second, and it is not possible for the invention described in Patent Literature 1 to solve such a problem.

FIG. 11 is an illustrative diagram illustrating an example in which the receiver 200 processes MPUs transmitted/received when a leap second is inserted. Also in the present example embodiment, by applying the flowchart exemplified in FIG. 7, an operation in which the receiver 200 processes MPUs transmitted/received when a leap second is inserted will be described below.

In the example illustrated in FIG. 11, MMTP packets of MPUs in which values indicated by mpu_sequence_number information are 1 to 10 are transmitted. Then, when a leap second insertion flag is set for time information included in the MMTP packets (Y of step S101) and a timing of inserting a leap second falls within a predetermined time (Y of step S102), the receiver 200 moves to processing of step S103, and when the above case is not realized (N of step S101 or N of step S102), the receiver 200 moves to processing of step S107. In the processing of step S107, the receiver 200 executes normal processing that processes MMTP packets used for presentation in an order based on MPU_presentation_time information (step S107). Then, the respective MMTP packets are subjected to processing for decoding and presentation in an order based on the MPU_presentation_time information.

Further, the receiver 200 determines to execute processing by changing the order in processing of step S103 (step S103).

Here, the leap second insertion flag continues to be set until NTP leap_indicator is indicated and a reset to 9:00:00. 0 is performed in FIGS. 10 and 11. Specifically, for example, a leap second insertion flag is set for time information included in MMTP packets transmitted before 9:00:00. 0, but no leap second insertion flag is set for time information included in MMTP packets transmitted after 9:00:00. 0.

Then, by repeating the processing of steps S204 to S206, the MMTP packets configuring the respective access units are decoded at timings in accordance with the value of pts_offset in an order of sequence numbers indicated by mpu_sequence_number information, as illustrated in the lower side of FIG. 10. Then, video and the like based on the respective MMTP packets are sequentially presented.

Here, in the example illustrated in FIG. 11, the receiver 200 sequentially decodes, from 8:59:57. 0, MMTP packets of an MPU in which mpu_sequence_number information indicates a value obtained by adding 1 to a value indicated by mpu_sequence_number information of MMTP packets of an MPU decoded immediately therebefore (step S104).

When a predetermined time has not passed from insertion of a leap second (N of step S106), the receiver 200 moves to the processing of step S104.

Then, by repeating the processing of steps S104 and S105, the MMTP packets of the respective MPUs are decoded on the basis of values indicated by mpu_sequence_number information as illustrated in the lower side of FIG. 11. Then, video and the like based on the MMTP packets of the respective MPUs are sequentially presented.

When the predetermined time has passed from insertion of the leap second (Y of step S106), the receiver 200 moves to normal processing for determining an order of MMTP packets used for presentation on the basis of MPU_presentation_time information (step S107).

The determination in the processing of step S106 may be performed on the basis of whether a predetermined time has passed from a time of not setting a leap second insertion flag in the same manner as in the case in the first example embodiment described above.

Here, "the predetermined time" in the processing of steps S102 and S106 is, for example, three seconds in the same manner as in the case in the first example embodiment described above. Therefore, the processing of steps S104 and S105 is repeated over three seconds each before and after a timing of inserting a leap second. Specifically, the processing of steps S104 to S106 is repeated, for example, from 8:59:57 that is three seconds before 9:00:00 when a leap second is inserted to 9:00:03 that is three seconds after 9:00:00 when the leap second has been inserted in the same manner as in the case in the first example embodiment described above.

Therefore, in the present example, the receiver 200 executes processing based on values indicated by mpu_sequence_number information over three seconds before and after a timing of inserting a leap second and executes normal processing of step S107 for a period other than the above.

It should be noted that in steps S104 and S105, in the same manner as in the first example embodiment, additional processing may be further executed. Specifically, the receiver 200 decodes respective MMTP packets by processing of step S104, and in addition, for example, at a timing in accordance with a value of pts_offset used in the calculation of equation (1) in processing of step S107 of an immediately prior stage. Specifically, timings of decoding the respective MMTP packets configuring the access units are determined so as to decode MMTP packets configuring the access units, for example, at time intervals in accordance with a value of pts_offset. Then, in addition to the processing of step S105, the receiver 200 determines timings of presenting video and audio in accordance with the respective MMTP packets configuring the access units, so as to present video and audio in accordance with MMTP packets configuring the access units, for example, at time intervals in accordance with a value of pts_offset. Then, the receiver 200 presents the video and audio at the determined timings.

Here, in general, in a series of MPUs, a value of pts_offset is not changed. Therefore, using the additional processing, it is possible that on the basis of a calculation result in processing of step S107 of the last time and a value of pts_offset used in the calculation, timings of decoding MMTP packets of access units from the next time are determined, and thereby the respective MMTP packets are decoded at appropriate timings and video and the like based on the MMTP packets are presented at appropriate timings.

Next, operations of the transmitter 100 and the receiver 200 upon eliminating a leap second to cause Coordinated Universal Time to be close to Universal Time will be described. When a leap second is eliminated, a leap second elimination flag in accordance with elimination of a leap second is set for time information transmitted from a predetermined prior time of a timing of eliminating the leap second to the timing. Here, the predetermined prior time is, for example, one month before the timing. The leap second elimination flag in the present example is equivalent to adjustment information. It should be noted that a timing of setting a flag, a reset timing, and a type of a flag to be set are not limited thereto, and a flag in accordance with another timing or another type may be used.

Figure 12:
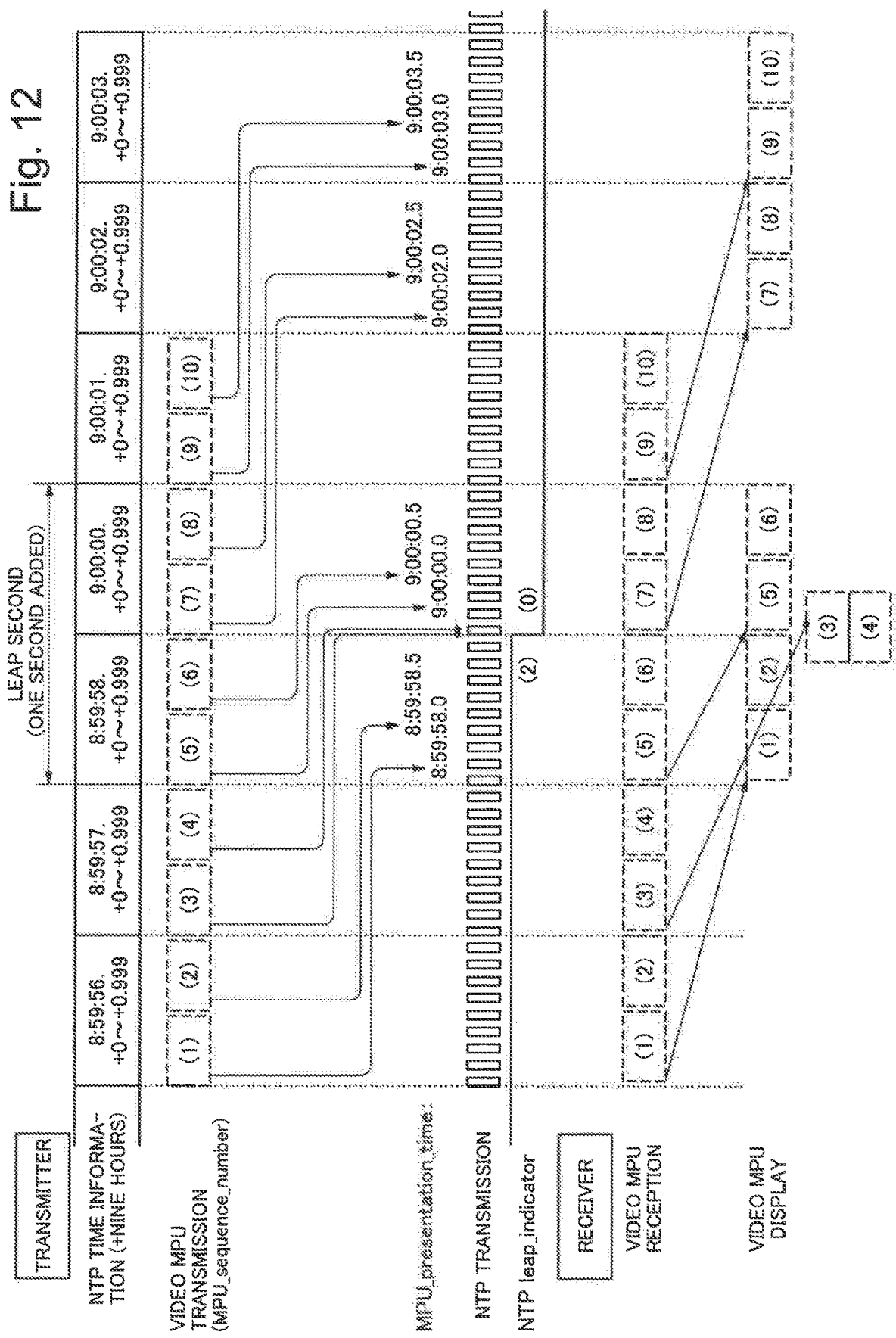
FIG. 12 is an illustrative diagram illustrating an example of MPUs transmitted/received when a leap second is eliminated.

FIG. 12 is an illustrative diagram illustrating an example of MPUs transmitted/received when a leap second is eliminated.

In the example illustrated in FIG. 12, it is assumed that respective MPUs are sequentially transmitted at intervals of 0.5 seconds. Then, in the example illustrated in FIG. 12, at 8:59:56. 0, respective MMTP packets of an MPU in which a value indicated by mpu_sequence_number information is "1" are transmitted. Further, at 8:59:56. 5, respective MMTP packets of an MPU in which a value indicated by mpu_sequence_number information is "2" are transmitted. At 8:59:57. 0, respective MMTP packets of an MPU in which a value indicated by mpu_sequence_number information is "3" are transmitted. Further, at 8:59:57. 5, respective MMTP packets of an MPU in which a value indicated by mpu_sequence_number information is "4" are transmitted. At 8:59:58. 0, respective MMTP packets of an MPU in which a value indicated by mpu_sequence_number information is "5" are transmitted. Further, at 8:59:58. 5, respective MMTP packets of an MPU in which a value indicated by mpu_sequence_number information is "6" are transmitted. At 9:00:00. 0, respective MMTP packets of an MPU in which a value indicated by mpu_sequence_number information is "7" are transmitted. Further, at 9:00:00. 5, respective MMTP packets of an MPU in which a value indicated by mpu_sequence_number information is "8" are transmitted. At 9:00:01. 0, respective MMTP packets of an MPU in which a value indicated by mpu_sequence_number information is "9" are transmitted. Further, at 9:00:01. 5, respective MMTP packets of an MPU in which a value indicated by mpu_sequence_number information is "10" are transmitted.

Here, it is assumed that a value in accordance with a presentation time indicated by MPU_presentation_time information indicates a value in accordance with a time after two seconds from a transmission time.

Then, in the example illustrated in FIG. 12, a presentation time in accordance with a value indicated by MPU_presentation_time information of MMTP packets of an MPU in which a value indicated by mpu_sequence_number information is "1" is 8:59:58. 0. Further, a presentation time in accordance with a value indicated by MPU_presentation_time information of MMTP packets of an MPU in which a value indicated by mpu_sequence_number information is "2" is 8:59:58. 5. A presentation time in accordance with a value indicated by MPU_presentation_time information of MMTP packets of an MPU in which a value indicated by mpu_sequence_number information is "3" is 8:59:59. 0. Further, a presentation time in accordance with a value indicated by MPU_presentation_time information of MMTP packets of an MPU in which a value indicated by mpu_sequence_number information is "4" is 8:59:59. 5. A presentation time in accordance with a value indicated by MPU_presentation_time information of MMTP packets of an MPU in which a value indicated by mpu_sequence_number information is "5" is 9:00:00. 0. Further, a presentation time in accordance with a value indicated by MPU_presentation_time information of MMTP packets of an MPU in which a value indicated by mpu_sequence_number information is "6" is 9:00:00. 5. A presentation time in accordance with a value indicated by MPU_presentation_time information of MMTP packets of an MPU in which a value indicated by mpu_sequence_number information is "7" is 9:00:02. 0. Further, a presentation time in accordance with a value indicated by MPU_presentation_time information of MMTP packets of an MPU in which a value indicated by mpu_sequence_number information is "8" is 9:00:02. 5. A presentation time in accordance with a value indicated by MPU_presentation_time information of MMTP packets of an MPU in which a value indicated by mpu_sequence_number information is "9" is 9:00:03. 0. Further, a presentation time in accordance with a value indicated by MPU_presentation_time information of MMTP packets of an MPU in which a value indicated by mpu_sequence_number information is "10" is 9:00:03. 5.

Therefore, there is not 8:59:59. 0 that is a presentation time in accordance with a value indicated by MPU_presentation_time information of MMTP packets of an MPU in which a value indicated by mpu_sequence_number information is "3." Further, there is not 8:59:59. 5 that is a presentation time in accordance with a value indicated by MPU_presentation_time information of MMTP packets of an MPU in which a value indicated by mpu_sequence_number information is "4." In other words, there is not presented either video and the like in accordance with the MMTP packets of the MPU in which a value indicated by mpu_sequence_number information is "3" or video and the like in accordance with the MMTP packets of the MPU in which a value indicated by mpu_sequence_number information is "4".

Further, there is not either an MPU in which a presentation time in accordance with a value indicated by MPU_presentation_time information is 9:00:01. 0 or an MPU in which a presentation time in accordance with a value indicated by MPU_presentation_time information is 9:00:01. 5.

In other words, when processing procedures of MPUs used for presentation are determined on the basis of set MPU_presentation_time information, a problem may occur upon eliminating a leap second. It is difficult for the invention described in Patent Literature 1 to solve such a problem.

Figure 13:
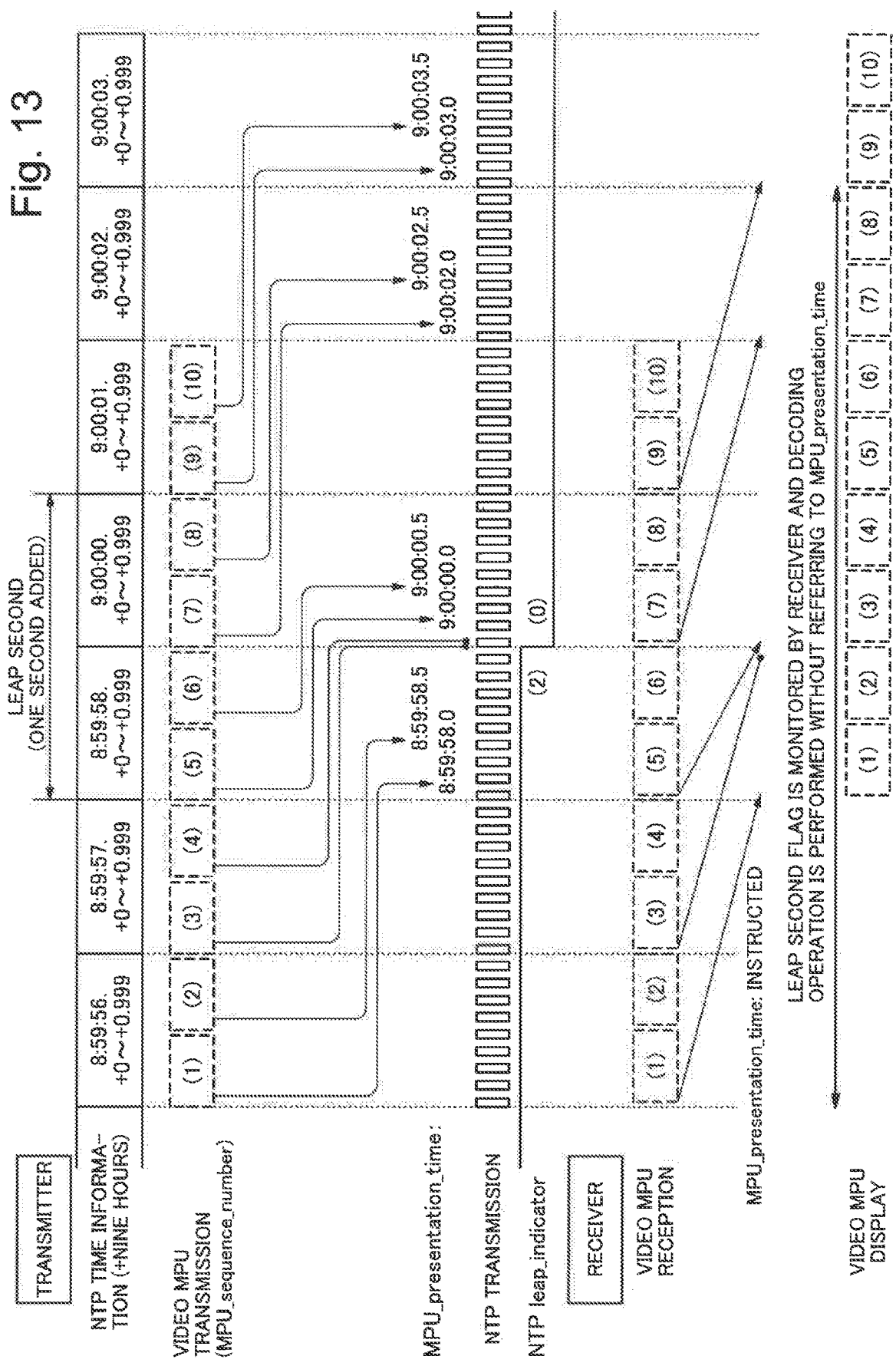
FIG. 13 is an illustrative diagram illustrating an example in which a receiver processes MPUs transmitted/received when a leap second is eliminated.
Figure 14:
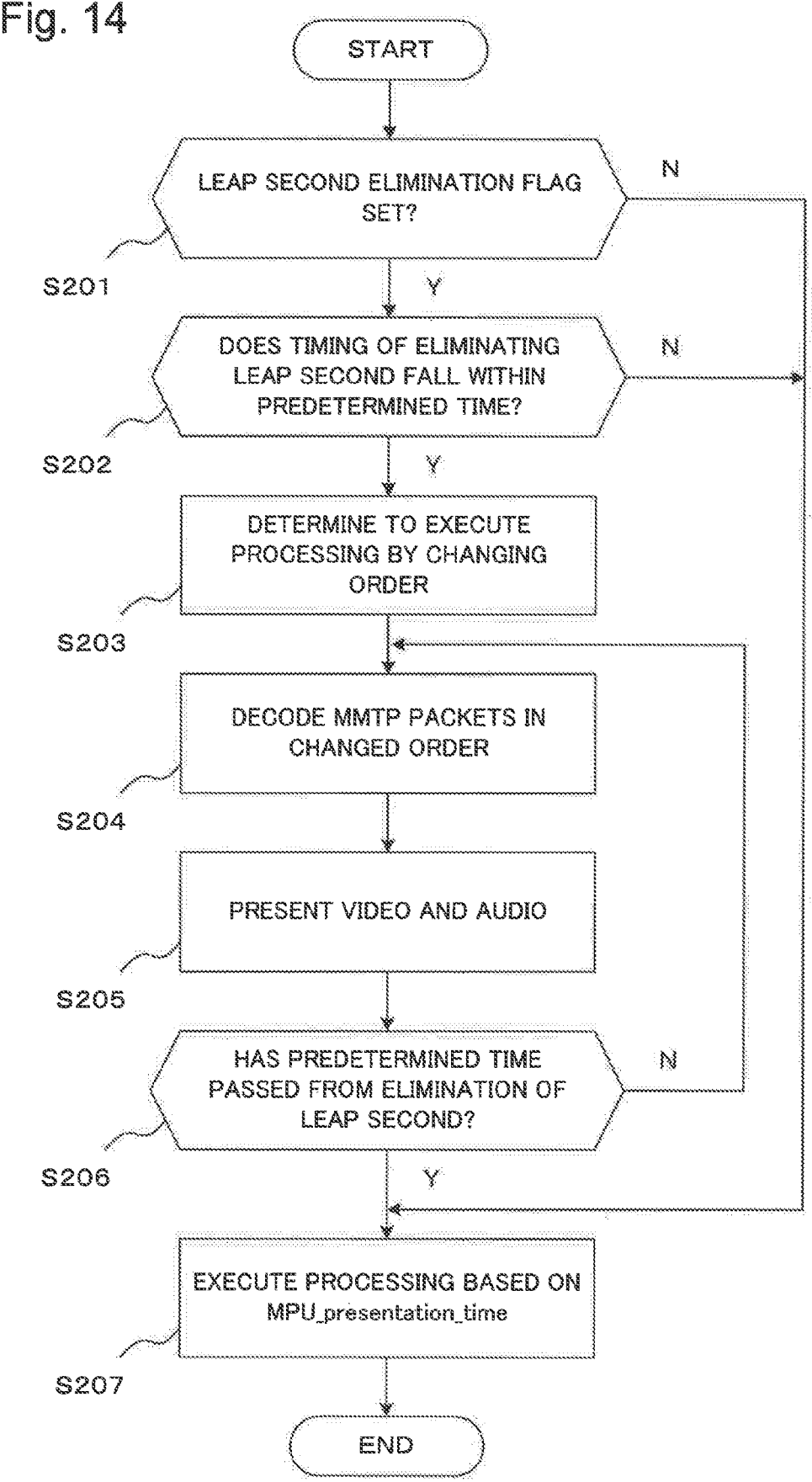
FIG. 14 is a flowchart illustrating an example in which a receiver processes MPUs transmitted/received when a leap second is eliminated.

FIG. 13 is an illustrative diagram illustrating an example in which the receiver 200 processes MPUs transmitted/received when a leap second is eliminated. FIG. 14 is a flowchart illustrating an example in which the receiver 200 processes MPUs transmitted/received when a leap second is eliminated.

In the example illustrated in FIG. 13, at the same timings as in the example illustrated in FIG. 12, MMTP packets of MPUs in which values indicated by mpu_sequence_number information are 1 to 10 are transmitted. Then, when a leap second elimination flag is set for time information included in the MMTP packets (Y of step S201) and a timing of eliminating a leap second falls within a predetermined time (Y of step S202), the receiver 200 moves to processing of step S203, and when the above case is not realized (N of step S201 or N of step S202), the receiver 200 moves to processing of step S207. In the processing of step S207, the receiver 200 executes normal processing that processes MMTP packets used for presentation in an order based on MPU_presentation_time information (step S207). Then, the respective MMTP packets are subjected to processing for decoding and presentation in an order based on mpu_sequence_number information.

Further, the receiver 200 determines to execute processing by changing the order in processing of step S203 (step S203).

Here, the leap second elimination flag continues to be set until NTP leap_indicator is indicated and a reset to 9:00:00. 0 is performed in FIGS. 12 and 13. Specifically, for example, a leap second elimination flag is set for time information included in MMTP packets transmitted before 9:00:00. 0, but no leap second elimination flag is set for time information included in MMTP packets transmitted after 9:00:00. 0.

Then, in the example illustrated in FIG. 13, the receiver 200 sequentially decodes, from 8:59:56. 0, MMTP packets in which mpu_sequence_number information indicates a value obtained by adding 1 to a value indicated by mpu_sequence_number information of MMTP packets of an MPU decoded immediately therebefore (step S204).

Then, as illustrated in the lower side of FIG. 13, MMTP packets of the respective MPUs generated and transmitted by the transmitter 100 in an order of values indicated by mpu_sequence_number information are decoded on the basis of the values indicated by the mpu_sequence_number information, and video and the like based on the MMTP packets of the respective MPUs are presented (step S205).

When a predetermined time has not passed from elimination of a leap second (N of step S206), the receiver 200 moves to the processing of step S204.

Then, by being repeated the processing of steps S204 and S205, the MMTP packets of the respective MPUs are decoded on the basis of the values indicated by the mpu_sequence_number information as illustrated in the lower side of FIG. 13. Then, video and the like based on the respective MMTP packets are sequentially presented.

When the predetermined time has passed from elimination of the leap second (Y of step S206), the receiver 200 moves to normal processing for determining an order of MMTP packets used for presentation on the basis of MPU_presentation_time information (step S207).

The determination in the processing of step S206 may be performed on the basis of whether a predetermined time has passed from a time of not setting of a leap second elimination flag.

Here, "the predetermined time" in the processing of steps S202 and S206 is, for example, three seconds. Therefore, the processing of steps S204 and S205 is repeated over three seconds each before and after a timing of eliminating a leap second. Specifically, the processing of steps S204 and S205 is repeated, for example, from 8:59:56 that is three seconds before 9:00:00 when a leap second is eliminated to 9:00:03 that is three seconds after 9:00:00 when the leap second has been eliminated.

Therefore, in the present example, the receiver 200 executes processing based on values indicated by mpu_sequence_number information over three seconds before and after a timing of eliminating a leap second and executes normal processing of step S207 for a period other than the above.

Here, in steps S204 and S205, additional processing may be further executed. Specifically, in addition to the processing of step S204, the receiver 200 decodes respective MMTP packets, for example, at a timing in accordance with a value of pts_offset used in the calculation of equation (1) in processing of step S207 of an immediately prior stage. Specifically, timings of decoding the respective MMTP packets configuring the access units are determined so as to decode MMTP packets configuring the access units at time intervals in accordance with a value of pts_offset, for example. Then, in addition to the processing of step S205, the receiver 200 determines timings of presenting video and audio in accordance with the respective MMTP packets configuring the access units, so as to present video and audio in accordance with MMTP packets configuring the access units at time intervals in accordance with a value of pts_offset, for example. Then, the receiver 200 presents the video and audio at the determined timings.

Here, in general, in a series of MPUs, a value of pts_offset is not changed. Therefore, using the additional processing, it is possible that on the basis of a calculation result in processing of step S207 of the last time and a value of pts_offset used in the calculation, timings of decoding MMTP packets of access units from the next time are determined, and thereby the respective MMTP packets are decoded at appropriate timings and video and the like based on the MMTP packets are presented at appropriate timings.

According to the present example embodiment, the receiver 200 processes MMTP packets of respective MPUs on the basis of values indicated by mpu_sequence_number information for a period in accordance with a timing of inserting a leap second and for a period in accordance with a timing of eliminating a leap second. Therefore, a problem caused due to insertion or elimination of a leap second can be prevented from occurring.

Specifically, it is possible that MMTP packets of respective MPUs are decoded in an appropriate order, and video and the like based on the MMTP packets are presented in an appropriate order for a period in accordance with a timing of inserting a leap second and for a period in accordance with a timing of eliminating a leap second.

Further, even when the receiver 200 receives packets in accordance with television program information and the like transmitted via a communication line and packets in accordance with television program information and the like transmitted by radio waves, decoding can be performed in an appropriate order in accordance with a processing order determined by a sending side, and further decoding can be performed at an appropriate timing in accordance with a determination of the sending side.

Furthermore, even when the receiver 200 receives packets in accordance with television program information and the like transmitted via a communication line in an order different from a transmission order, decoding can be performed in an appropriate order in accordance with a processing order determined by a sending side, and further decoding can be performed at an appropriate timing in accordance with a determination of the sending side.

A Third Example Embodiment

Figure 15:
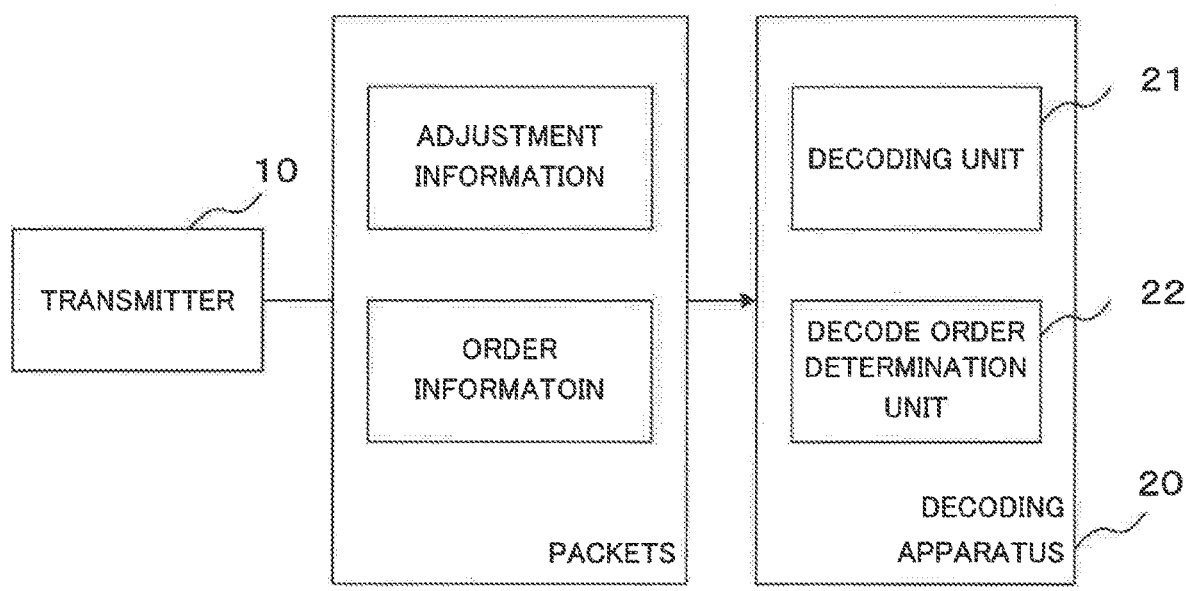
FIG. 15 is a block diagram illustrating a configuration example of a decoding apparatus of a third example embodiment of the present invention.

Next, a decoding apparatus 20 of a third example embodiment of the present invention will be described with reference to the accompanying drawings. FIG. 15 is a block diagram illustrating a configuration example of the decoding apparatus 20 of the third example embodiment of the present invention. As illustrated in FIG. 15, the decoding apparatus 20 of the third example embodiment of the present invention includes a decoding unit 21 and a decode order determination unit 22.

The decoding unit 21 decodes packets transmitted from a transmitter 10 (equivalent to the transmitter 100 in the first and second example embodiments illustrated in FIG. 1).

The decode order determination unit 22 determines an order of the packets decoded by the decoding unit 21 on the basis of adjustment information in accordance with adjustment of times for causing Coordinated Universal Time to be close to Universal Time, the times being included in the packets.

The packets include order information that indicates an order in the same IP data flow, and the decode order determination unit 22 determines the order of the packets decoded by the decoding unit 21 on the basis of the order information when the adjustment information indicates that the times are adjusted.

According to the present example embodiment, pieces of information sequentially transmitted can be decoded and reproduced in an appropriate order.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

Further, the direction of the arrows in the accompanying drawings is illustrated as an example and does not limit the direction of signals between blocks.

This application is based upon and claims the benefit of priority from Japanese patent application No. 2015-040480, filed on Mar. 2, 2015, the disclosure of which is incorporated herein in its entirety by reference.

REFERENCE SIGNS LIST 10, 100 transmitter
20 decoding apparatus
21 decoding unit
22 decode oder determination unit
200 receiver
300, 500 antenna
400 communication line
600a, 600b multimedia information

The invention claimed is:

1. A receiver comprising:
a reception apparatus configured to:
receive a plurality of assets, each asset including a Media Processing Unit (MPU);
receive a leap second insertion flag indicating when a leap second will be inserted; and
receive a leap second deletion flag indicating when a leap second will be deleted; and
a decoding apparatus configured to:
decode the MPU for a sequence number to enable identification of the MPU, and a time stamp information referencing UTC (Coordinated Universal Time) in the MPU, the time stamp information representing a presentation time of the MPU,
wherein the leap second insertion flag and the leap second deletion flag indicate a presence of a leap second event,
wherein the MPU includes Moving Picture Experts Group (MPEG) Media Transport Protocol (MMTP) packets for each asset in the plurality of assets via respective MMTP packets, a packet identification (ID), and the plurality of assets includes a video asset and an audio asset,
wherein the video asset is delivered to a first buffer based on the packet ID of the video asset, the audio asset is delivered to a second buffer based on the packet ID of the audio asset, and a control message is delivered to a third buffer, and
wherein the leap second event follows the presentation time of the MPU, and a timing of presenting video and audio is based on the leap second event, and the video and the audio are based on the MPU.

2. The receiver of claim 1, wherein the control message comprises information used to control the receiver.

3. A method for receiving data, the method comprising:
   receiving a plurality of assets, each asset including a Media Processing Unit (MPU);
   receiving a leap second insertion flag indicating when a leap second will be inserted;
   receiving a leap second deletion flag indicating when a leap second will be deleted; and
   decoding the MPU for a sequence number to enable identification of the MPU, and a time stamp information referencing UTC (Coordinated Universal Time) in the MPU, the time stamp information representing a presentation time of the MPU,
   wherein the leap second insertion flag and the leap second deletion flag indicate a presence of a leap second event,
   wherein the MPU includes Moving Picture Experts Group (MPEG) Media Transport Protocol (MMTP) packets for each asset in the plurality of assets via respective MMTP packets, a packet identification (ID), and the plurality of assets includes a video asset and an audio asset,
   wherein the video asset is delivered to a first buffer based on the packet ID of the video asset, the audio asset is delivered to a second buffer based on the packet ID of the audio asset, and a control message is delivered to a third buffer, and
   wherein the leap second event follows the presentation time of the MPU, and a timing of presenting video and audio is based on the leap second event, and the video and the audio are based on the MPU.

4. The method of claim 3, wherein the control message comprises information used to control the receiver.

5. A non-transitory computer-readable storage medium for storing a data receiving computer program that causes a computer to execute:
   receiving a plurality of assets, each asset including a Media Processing Unit (MPU);
   receiving a leap second insertion flag indicating when a leap second will be inserted;
   receiving a leap second deletion flag indicating when a leap second will be deleted; and
   decoding the MPU for a sequence number to enable identification of the MPU, and a time stamp information referencing UTC (Coordinated Universal Time) in the MPU, the time stamp information representing a presentation time of the MPU,
   wherein the leap second insertion flag and the leap second deletion flag indicate a presence of a leap second event,
   wherein the MPU includes Moving Picture Experts Group (MPEG) Media Transport Protocol (MMTP) packets for each asset in the plurality of assets via respective MMTP packets, a packet identification (ID), and the plurality of assets includes a video asset and an audio asset,
   wherein the video asset is delivered to a first buffer based on the packet ID of the video asset, the audio asset is delivered to a second buffer based on the packet ID of the audio asset, and a control message is delivered to a third buffer, and
   wherein the leap second event follows the presentation time of the MPU, and a timing of presenting video and audio is based on the leap second event, and the video and the audio are based on the MPU.

6. The non-transitory computer-readable storage medium of claim 5, wherein the control message comprises information used to control the receiver.

* * * * *